United States Patent [19]
Clausen et al.

[11] Patent Number: 5,454,767
[45] Date of Patent: Oct. 3, 1995

[54] POWERSHIFT TRANSMISSION CONTROL SYSTEM WITH TURBO BOOST MONITOR

[75] Inventors: Scott A. Clausen, Coldwater, Ohio; Adrian G. Kallis, Fargo, N. Dak.

[73] Assignees: AGCO Corporation, Duluth, Ga.; Phoenix International Corporation, Fargo, N. Dak.

[21] Appl. No.: 176,021

[22] Filed: Dec. 30, 1993

[51] Int. Cl.$^6$ .......................... B60K 41/04; B60K 41/02
[52] U.S. Cl. ............................ 477/32; 477/156; 477/161
[58] Field of Search ................ 477/32, 33, 115, 477/121, 161, 163, 164, 156

[56] References Cited

U.S. PATENT DOCUMENTS

| | | | |
|---|---|---|---|
| 3,699,994 | 10/1972 | Mohri | 477/143 X |
| 3,941,015 | 3/1976 | Robinson . | |
| 4,263,826 | 4/1981 | Hartz et al. | 477/30 |
| 4,425,620 | 1/1984 | Batchellor et al. | 477/99 X |
| 4,458,471 | 7/1984 | Herwig . | |
| 4,855,913 | 8/1989 | Brekkestran et al. | 477/80 X |
| 4,858,496 | 8/1989 | Iwatsuki et al. | 477/33 |
| 4,928,557 | 5/1990 | Takada et al. | 477/151 |
| 5,388,476 | 2/1995 | Harger et al. | 74/473 R |

OTHER PUBLICATIONS

SAE Technical Paper Series 850169, "A New Electronically Controlled Injection Pump for Diesels", 1985.

*Primary Examiner*—Rodney H. Bonck
*Attorney, Agent, or Firm*—Harness, Dickey & Pierce

[57] ABSTRACT

A method for controlling shifting of a powershift transmission of an agricultural vehicle in accordance with a boost pressure developed by a turbocharger of an engine associated with said vehicle. The turbocharger generates a turbo boost pressure which is indicative of the engine torque being produced by the engine at a given time. The turbo boost pressure is monitored by a sensor which generates a boost pressure signal in accordance with the sensed boost pressure. This signal is then modified in accordance with the sensed engine speed of the vehicle to produce a compensated turbo boost signal. The compensated turbo boost signal is compared against predetermined full-load and no-load turbo boost values to determine the percentage value of full-load boost pressure, and thus the load on the engine, at a given time. The percentage value is then used to help generate an appropriate duty cycle and time value for a pulse-width-modulated drive signal which is used to modulate the on-coming directional clutch into engagement at a desired rate of engagement dependent upon the load being experienced by the vehicle.

20 Claims, 17 Drawing Sheets

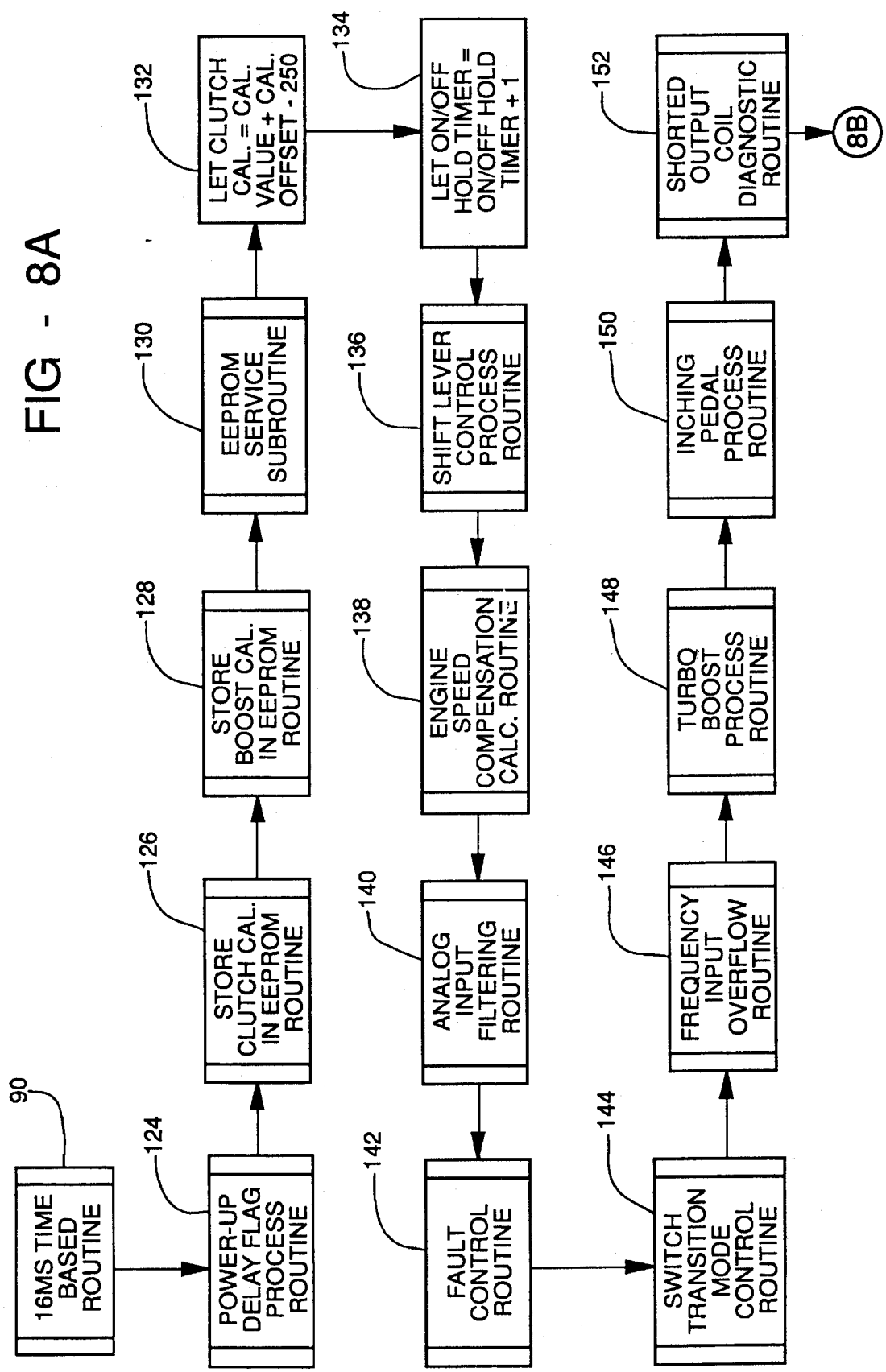

FIG - 10

TURBO BOOST CONDITIONING TABLE

```
        54 BOOST_CONDITION_TBL:
0000& 019F         DW    415    1.6230   ;MULTIPLIER FOR BOOST AT    0 RPM
0002& 019F         DW    415    1.6230   ;MULTIPLIER FOR BOOST AT  100 RPM
0004& 019F         DW    415    1.6230   ;MULTIPLIER FOR BOOST AT  200 RPM
0006& 019F         DW    415    1.6230   ;MULTIPLIER FOR BOOST AT  300 RPM
0008& 019F         DW    415    1.6230   ;MULTIPLIER FOR BOOST AT  400 RPM
000A& 019F         DW    415    1.6230   ;MULTIPLIER FOR BOOST AT  500 RPM
000C& 019F         DW    415    1.6230   ;MULTIPLIER FOR BOOST AT  600 RPM
000E& 019F         DW    415    1.6230   ;MULTIPLIER FOR BOOST AT  700 RPM
0010& 019F         DW    415    1.6230   ;MULTIPLIER FOR BOOST AT  800 RPM
0012& 019F         DW    415    1.6230   ;MULTIPLIER FOR BOOST AT  900 RPM
0014& 0183         DW    387    1.5100   ;MULTIPLIER FOR BOOST AT 1000 RPM
0016& 0163         DW    355    1.3860   ;MULTIPLIER FOR BOOST AT 1100 RPM
0018& 0150         DW    336    1.3120   ;MULTIPLIER FOR BOOST AT 1200 RPM
001A& 013F         DW    319    1.2450   ;MULTIPLIER FOR BOOST AT 1300 RPM
001C& 0132         DW    306    1.1960   ;MULTIPLIER FOR BOOST AT 1400 RPM
001E& 0125         DW    293    1.1450   ;MULTIPLIER FOR BOOST AT 1500 RPM
0020& 0117         DW    279    1.0910   ;MULTIPLIER FOR BOOST AT 1600 RPM
0022& 010E         DW    270    1.0550   ;MULTIPLIER FOR BOOST AT 1700 RPM
0024& 010B         DW    267    1.0410   ;MULTIPLIER FOR BOOST AT 1800 RPM
0026& 010B         DW    267    1.0420   ;MULTIPLIER FOR BOOST AT 1900 RPM
0028& 0104         DW    260    1.0150   ;MULTIPLIER FOR BOOST AT 2000 RPM
002A& 0100         DW    256    1.0000   ;MULTIPLIER FOR BOOST AT 2100 RPM
002C& 0100         DW    256    1.0000   ;MULTIPLIER FOR BOOST AT 2200 RPM
002E& 0100         DW    256    1.0000   ;MULTIPLIER FOR BOOST AT 2300 RPM
0030& 0100         DW    256    1.0000   ;MULTIPLIER FOR BOOST AT 2400 RPM
0032& 0100         DW    256    1.0000   ;MULTIPLIER FOR BOOST AT 2500 RPM
0034& 0100         DW    256    1.0000   ;MULTIPLIER FOR BOOST AT 2600 RPM
```

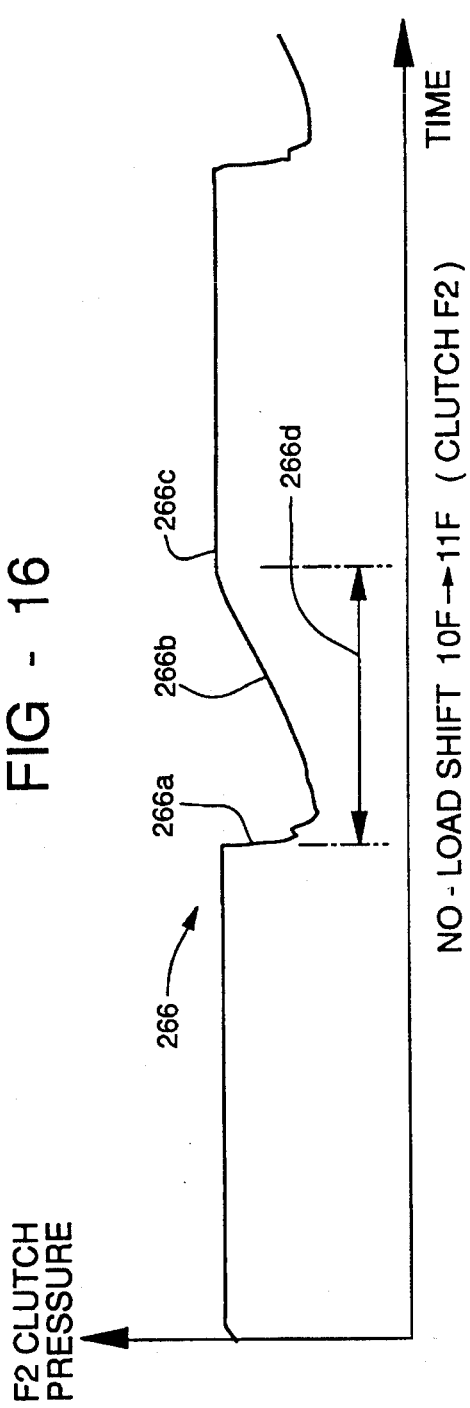
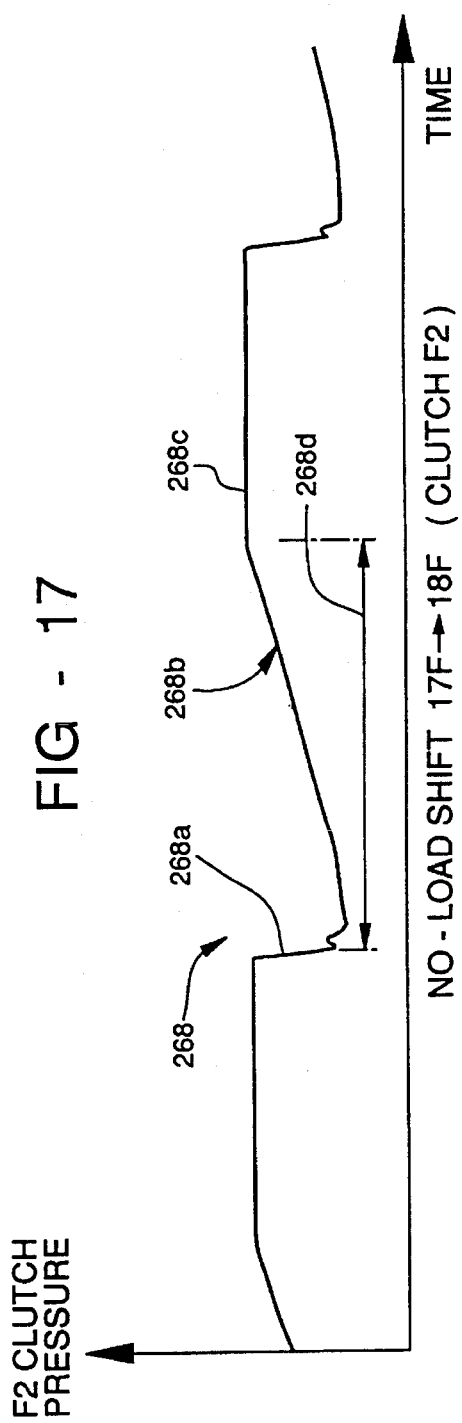

POWERSHIFT TRANSMISSION CONTROL SYSTEM WITH TURBO BOOST MONITOR

BACKGROUND OF THE INVENTION

1. Technical Field

This invention relates generally to electronically controlled powershift transmissions for large agricultural vehicles, and more particularly to a method for determining the load being experienced by the vehicle from the boost pressure developed by a turbocharger associated with an engine of the vehicle, and controlling the engagement of a plurality of proportionally modulatable clutches in accordance with the load being experienced by the vehicle.

2. Discussion

Electronically controlled powershift transmissions are used in a wide variety of large agricultural and earth moving vehicles. These transmissions typically include a plurality of clutches which may be gradually modulated into engagement, as well as a plurality of "on-off" clutches which are not proportionally modulatable. Such transmissions also typically provide for a plurality of forward gear ratios as well as a plurality of reverse gear ratios. Shifting between any of the forward or reverse gear ratios, or between neutral and a forward or reverse gear ratio, typically involves engaging various combinations of the proportionally modulatable directional clutches and the on-off clutches to achieve the desired forward or reverse gear ratio. Frequently an electronic transmission control system is employed for generating the current drive signals for such proportionally modulatable clutches. Examples of such control systems are disclosed in U.S. Pat. Nos. 4,855,913 to Brekkestran et al. and 4,425,620 to Batcheller et al., both of which are hereby incorporated by reference.

Engines associated with large agricultural or earth moving vehicles also frequently employ a turbocharger. As is well understood, turbochargers operate by receiving exhaust gasses from an exhaust manifold of the engine and using the exhaust gasses to drive a turbine of an input power section. The input power section is coupled to an output power section which also includes a turbine adapted to draw ambient air into the turbocharger. The ambient air drawn in is directed into the intake manifold of the engine and thereafter directed into the individual cylinders. The input power section and output power section are coupled together so that they always rotate synchronously. As the engine rpm increases, the rate of flow of the generated exhaust gasses increases which causes the turbocharger to draw in a greater amount of ambient air, and therefore develop a greater "boost" pressure in the intake manifold. Since the boost pressure increases almost as quickly as the engine torque developed, the boost pressure at any given time itself represents a very good approximation of the torque being generated at the same instant by the engine. Since engine torque increases generally in accordance with the loading on the vehicle, the boost pressure generated by the turbocharger represents a very good approximation of the current engine torque— and thus the load being experienced by the vehicle—at any given time.

Determining the load the vehicle is operating under before a shift is made is important during certain shifts where the proportionally modulatable clutches are modulated into engagement to accomplish the shift. This is because the load on the vehicle influences how quickly the shift should be executed. For example, if the vehicle is lightly loaded, a rapid shift (involving very rapidly modulating the pertinent proportionally modulatable directional clutch into complete engagement) would cause the vehicle to "lurch" significantly as the shift is completed. This condition is stressful not only on the internal components of the powershift transmission but also on the drive line components of the vehicle. Moreover, the lurch produced by a too-quickly executed shift can add to operator fatigue as the vehicle is operated over a prolonged period of time where significant shifting is required.

Conversely, if the vehicle is heavily loaded when a shift is commanded by the operator, the vehicle will almost instantly decelerate producing a significant, momentary "jolt" as an off-going proportionally modulated clutch disengages while an on-coming proportionally modulated clutch gradually is modulated into complete engagement. This condition is also hard on the internal components of the transmission as well as the drive line components of the vehicle. Additionally, the speed of the vehicle and/or engine torque may drop significantly during the time interval between the off-going clutch disengaging and the on-coming clutch fully engaging, thus causing the engine torque to drop below the peak point.

Therefore, it is highly desirable to tailor the rate of engagement of the proportionally modulatable clutch which is modulated into engagement during a shift from one gear ratio to the next depending upon the load which is being experienced by the vehicle, and thus the engine, at the instant just prior to the shift being executed. If the vehicle is operating under a no-load condition, preferably the proportionally modulatable clutch should be modulated into engagement at a slower rate of engagement to produce a "smooth" shift, and to prevent a lurch of the vehicle as the shift is executed. If the vehicle is heavily loaded, the modulatable clutch should be modulated into engagement much more quickly than during a no-load condition to avoid sudden deceleration of the vehicle as the shift is executed. Still further, it would be preferable to modulate the proportionally modulatable clutch into engagement at a rate somewhere between that which would be used for a no-load condition and that which would be used for a full-load condition, to thus tailor the rate at which the clutch is modulated into engagement in close accordance with the approximated load being experienced by the engine.

It is therefore a principal object of the invention to provide a method and apparatus for controlling the shifting of a powershift transmission in accordance with the load being experienced by the engine to thereby produce significantly smoother shifts between various gear ratios of the transmission.

It is another object of the present invention to provide a method and apparatus for monitoring the boost pressure developed by a turbocharger associated with an engine of an agricultural vehicle and to use the sensed turbo boost pressure to obtain an approximation of the load being experienced by the engine just prior to initiating the commanded shift, and to control the rate of engagement of a proportionally modulatable clutch needed to effect the commanded shift at a rate of engagement in accordance with the approximated engine load.

It is still another object of the present invention to provide a method and apparatus for controlling the engagement of a proportionally modulatable clutch of a powershift transmission of an agricultural vehicle such that when a proportionally modulatable directional clutch is involved in executing a shift, the directional clutch is caused to be engaged at a rate of engagement which is dependent upon the load being experienced by the vehicle just prior to the shift being initiated.

SUMMARY OF THE INVENTION

The above and other objects are provided by preferred methods and apparatus of the present invention for monitoring the turbo boost generated by a turbocharger of an engine of a vehicle, and controlling a powershift transmission of the vehicle in accordance with the sensed turbo boost pressure. The method generally includes monitoring the boost pressure generated by a turbocharger associated with an engine of a large agricultural vehicle and generating a turbo boost pressure signal in accordance therewith. The boost pressure signal is related to the engine torque being generated, which is in turn related to the load being experienced by the engine at a given time. The boost pressure signal is used to determine a desired shift modulation profile from predetermined no-load and full-load turbo boost information stored in a memory of an electronic controller system associated with the powershift transmission. The desired shift modulation profile is such as to be able to effect control over an on-coming, proportionally modulatable clutch which is being engaged during the shift so as to engage the clutch at a predetermined rate of engagement dependent on the engine torque being produced by the engine, so as to produce a shift that does not cause any lurching or other sudden deceleration of the vehicle.

In the preferred method the engine speed is also monitored. The turbo boost pressure signal is further modified by multiplying it by a predetermined constant based on the engine speed of the vehicle at the time a shift is commanded. Accordingly, should the turbo boost pressure signal begin to drop as the engine exceeds its peak torque producing capability and "lugs down", the turbo boost signal is modified so as not to erroneously indicate a dropping engine torque, and thus a decreasing load on the engine.

In the preferred embodiment the turbo boost signal is modified by adding to it a vehicle-specific calibration constant which removes variations from turbo boost sensor readings caused by tolerance differences and hardware of the controller system of the transmission, the turbo boost pressure sensor itself and the engine itself. This produces a "normalized" turbo boost value. The normalized turbo boost value is then multiplied by the constant which is based on the sensed engine speed, which produces a "conditioned" turbo boost pressure signal. This conditioned turbo boost pressure signal thus compensates for the drop in boost pressure which would occur as the engine lugs down in response to a load which exceeds its torque producing capability, and which causes a drop in engine rpm.

In the preferred method, the conditioned turbo boost signal is rationalized against the stored full-load and no-load turbo boost values to determine what percentage of full-load the conditioned turbo boost signal represents. If the conditioned boost signal is at or below the predetermined no-load turbo boost value, which represents the engine operating at wide open throttle ("WOT") without being subjected to any external load, then a pulse-width-modulated ("PWM") signal is generated in accordance with a predetermined no-load duty cycle and predetermined no-load time value to modulate the on-coming directional clutch into engagement within the predetermined no-load time interval. If the conditioned turbo boost signal is above the predetermined full-load turbo boost value, where the full-load boost value represents the turbo boost pressure generated by the engine at maximum power while being operated under a full-load, then a PWM drive signal having a predetermined full-load duty cycle for a predetermined full-load time value is generated for modulating the on-coming directional clutch into engagement at a predetermined rate of engagement.

If the conditioned boost pressure signal is between the predetermined no-load and full-load boost pressure values, the percentage value of full-load boost pressure is used to scale down the PWM duty cycle and time value associated with the full-load shift modulation profile, linearly, to cause the on-coming modulated directional clutch to be modulated into engagement at a rate of engagement, and for a time period, which are each a percentage of those values which Would be used to implement a full-load shift.

BRIEF DESCRIPTION OF THE DRAWINGS

The various advantages of the present invention will become apparent to one skilled in the art by reading the following specification and subjoined claims and by referencing the following drawings in which:

FIG. 10 is an exemplary listing of the boost multipliers which may be applied at various engine speeds to compensate for the dropping boost pressure that would be experienced as the engine begins to lug down in response to an external load;

FIG. 16 is a graph of the pressure over time applied to the F2 clutch while up-shifting from gear 10F to gear 11F under a no-load condition;

FIG. 17 is a graph of the pressure over time applied to the F2 clutch during upshifting from gear 17F to gear 18F under a no-load condition;

DETAILED DESCRIPTION OF THE PREFERRED EMBODIMENTS

Figure 1:
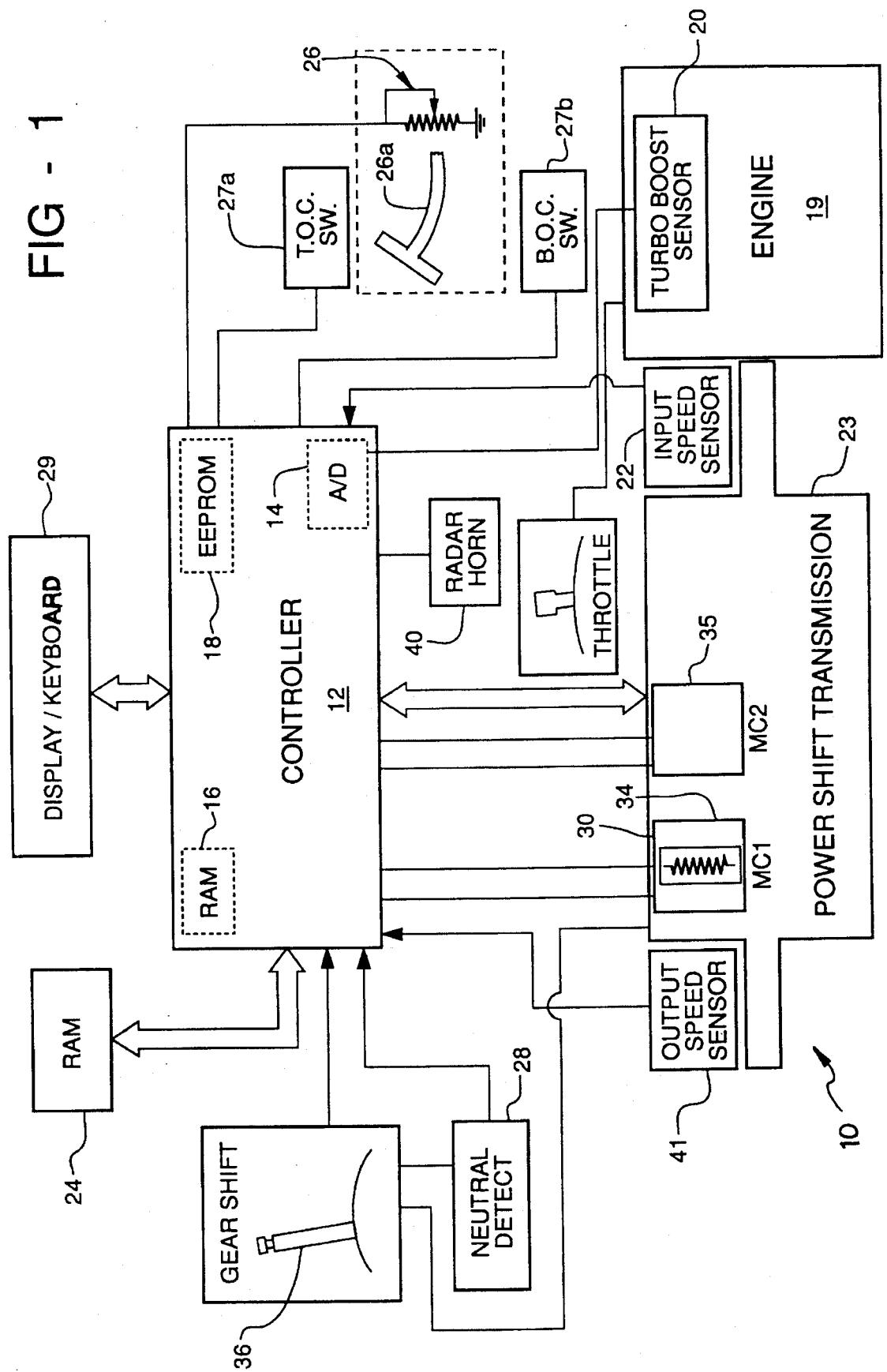
FIG. 1 is a simplified block diagram of a turbo boost control system in accordance with the present invention.

Referring to FIG. 1, there is shown a simplified block diagram of an electronic transmission control system which may be used in connection with the preferred method of the present invention. The system 10 generally includes an electronic controller 12 having an internal analog-to-digital (A/D) converter 14, an internal random access memory (RAM) 16, and an internal, programmable erasable, read only memory (EEPROM) 18.

A turbo boost pressure sensor 20 is coupled to an input port of the controller 12 as is a conventional engine speed sensor 22. The turbo boost pressure sensor is used to measure the boost pressure developed by a turbocharger associated with an engine 19 of the vehicle and preferably produces about 1.5 volts at 100 kPa, and 3.5 volts at 200 kPa. The engine speed sensor 22 is preferably a variable reluctance magnetic pick-up (VRMP) sensor which monitors a gear on the input shaft of a powershift transmission 23, whose speed is representative of the input shaft of the powershift transmission 23 of the vehicle. In the preferred embodiment the VRMP sensor 22 monitors a gear having 42 equally spaced teeth. The controller 12 divides the signal generated by the sensor 22 by a factor of 16, giving the controller 12 a signal of 2.625 pulses per revolution. This provides a signal equivalent to about 0.04375 Hz per rpm. An output shaft speed sensor 41 is also included which also is in the form of a VRMP type sensor. This sensor preferably monitors the speed of a gear having 72 approximately spaced teeth and provides a signal equivalent to 1.2 Hz/rpm. Optionally, a true ground speed sensor, such as a radar horn 40, may be included to provide an indication of true vehicle ground speed.

The system 10 further preferably includes external inching clutch pedal position sensor 26 for an inching clutch pedal 26a, a top-of-clutch position switch 27a, a bottom-of-clutch pedal position switch 27b, a neutral detection sensor 28, a display/keyboard 29 mounted within the vehicle interior and a coil temperature sensor 30. Coil temperature sensor 30 is associated with a modulated proportional valve MC1, indicated by reference numeral 34, whose temperature is assumed to be approximately equal to a second modulated proportional valve MC2, designated by reference numeral 35. The temperature sensor 30 is a thermistor which provides a voltage signal indicative of the temperatures of the solenoid coils of valves MC1 and MC2. By knowing these temperatures, further compensation can be made to the drive signals used to modulate the clutches associated with these valves to compensate for varying coil temperatures which affect the operation of the solenoid valves MC1 and MC2. The controller 12 is further responsive to a shift control lever 36 for selecting various gear ratios of the powershift transmission 23, as well as directional modes of operation (i.e., either forward or reverse).

In the preferred embodiment the controller 12 is represented by a Motorola 68HC11E1 microprocessor which is operated in its expanded mode. For purposes of illustration only, the methods of the present invention will be described while making reference to a Funk 8000 series powershift transmission, which is manufactured by the Funk Corporation of Coffeyville, Kans. This particular model of transmission provides 18 forward and 9 reverse gear ratios which are selected by engaging combinations of hydraulic clutches via solenoid control. The clutches are divided into three groups of three clutches, identified as "number" clutches 1, 2 and 3, "letter" clutches A, B and C, and "directional" clutches F1, F2 and R. The desired gear ratio is selected by engaging one clutch from each group. The directional clutches F1 and F2 are involved whenever a shift from gear 9F to gear 10F or gear 10F to gear 9F is commanded. The R directional clutch is involved when shifting from neutral to any reverse gear. Clutch F1 is involved when shifting from neutral to gears 1F–9F. Clutch F2 is involved when shifting into any of gears 10F–18F.

Each of the nine clutches further has an "on/off" solenoid which allows the clutch to engage when power is applied. The modulated proportional valves 34 and 36 shown in simplified form in FIG. 1 are used to control the pressure to the directional clutches F1, F2 and R. Valve MC1 controls pressure to the F1 directional clutch while proportionally modulatable valve MC2 controls pressure to both the F2 and R directional clutches. Valves MC1 and MC2 cause decreasing clutch pressure with increasing current and are ideally suited for use with pulse-width-modulated (PWM) current drive signals generated by the controller 12. Put differently, as the duty cycle of the drive signal to either one of valves MC1 or MC2 is increased, this causes decreasing hydraulic pressure which allows the Belleville springs associated with the directional clutch to urge the clutch into engagement. The presently preferred embodiments do not contemplate controllably varying the rate of engagement of the R (reverse) directional clutch, as is done with the F1 and F2 directional clutches. However, it will be appreciated that the teachings set forth herein could readily be applied, if desired for a specific application, by those of ordinary skill in the art to also vary the rate of engagement of the R directional clutch.

DETERMINATION OF FULL-LOAD AND NO-LOAD SHIFT MODULATION PROFILES

The preferred methods of the present invention incorporate the use of predetermined shift modulation profiles for no-load and full-load shifts. The no-load and full-load shift modulation profiles each represent a "pressure vs. time"

shift profile which is intended to bring the involved oncoming clutch into engagement at a predetermined rate of engagement. The full-load and no-load shift modulation profiles are used by the controller 12 to generate PWM drive signals each having a suitable duty cycle, for a suitable time, to produce the desired pressure vs. time shift profile. Accordingly, when a full-load shift is desired, for example, the controller 12 generates a PWM signal having a duty cycle sufficient to modulate the on-coming directional clutch (i.e., clutch F1 or F2) into engagement at the desired rate of engagement, for the desired time period, to match the predetermined full-load pressure vs. time curve. Put differently, the PWM signal controls the rate at which the proportional solenoid valve being modulated (i.e., either valve MC1 or MC2) is opened, for a specific, predetermined time period, to accomplish the full-load shift.

Figure 2:
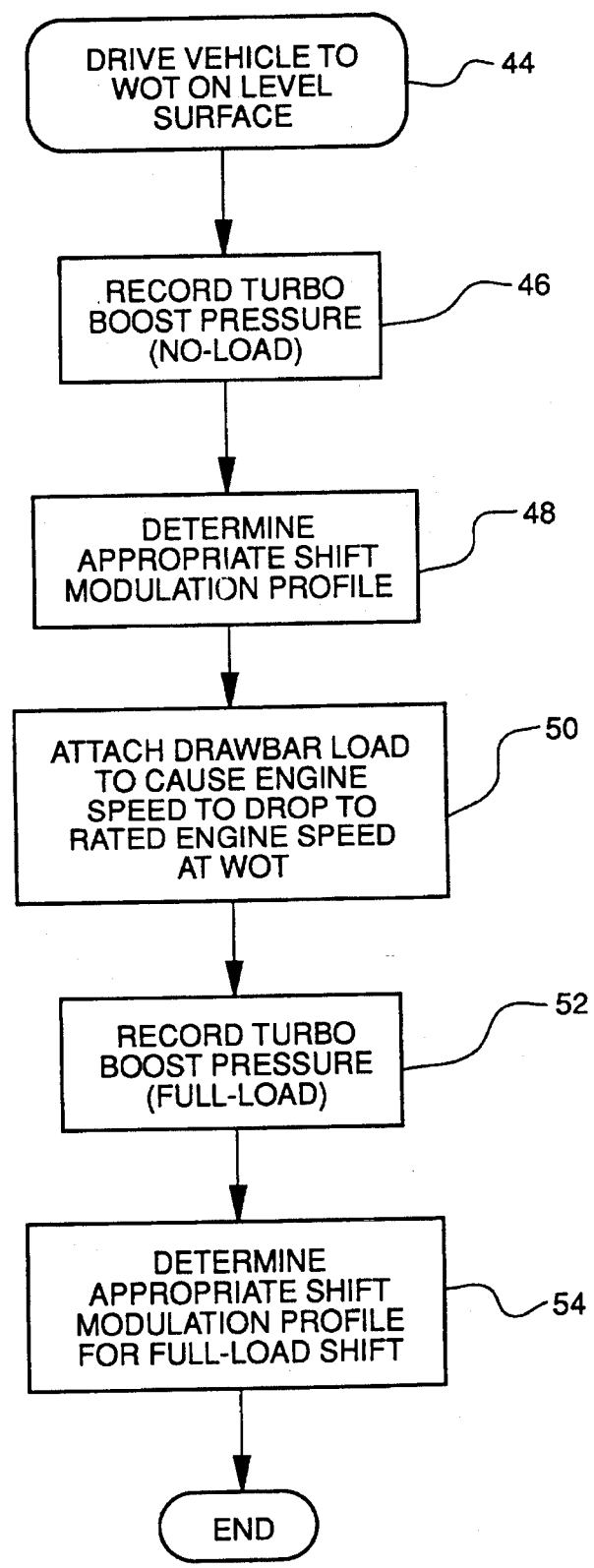
FIG. 2 is a flow chart illustrating the calibration procedure undertaken to determine the turbo boost value under full-load and no-load conditions.

With brief reference to FIG. 2, the steps used to determine the full-load and no-load shift modulation profiles are presented. Initially, the vehicle is driven on a level surface, and preferably a concrete surface to minimize the drag on the vehicle, until a wide open throttle (WOT) condition is achieved, as indicated at step 44. Next, the turbo boost pressure reading (i.e., value) from the turbo boost pressure sensor 20 is recorded under a no-load condition, as indicated at step 46. At step 48, the appropriate no-load shift modulation profile is determined to provide a desired rate of engagement for any one of the directional clutches when a shift is commanded under a no-load condition. This is determined by trying different duty cycle values and time values until a combination is decided on which produces the appropriate "feel" for a shift under a no-load condition. Such a shift, as mentioned previously, is preferably one which takes place rapidly but without vehicle jolt or lurch.

With continued reference to FIG. 2, a drawbar load is then attached to the vehicle which is sufficient to cause the engine speed at wide open throttle to drop to "rated" engine speed for the particular engine being used. As will be appreciated, the rated engine speed of an engine is understood to mean that engine speed which causes the engine to produce its peak torque. This procedure is indicated at step 50. At step 52, the turbo boost pressure from the turbo boost pressure sensor 20 is recorded, which represents the boost pressure value under a full-load condition. Next, as indicated at step 54, an appropriate shift modulation profile (i.e., pressure vs. time) curve is determined to produce a desired rate of engagement for a shift made under a full-load condition. More specifically, an appropriate duty cycle and time period will be determined, through repeated experimentation, which cause the on-coming directional clutch to engage at a rate of engagement and within a desired time. This rate of engagement and time period will be such as to produce a shift which is rapid enough to prevent the engine rpm from dropping appreciably while the shift is being executed, to thereby produce a smooth shift without sudden vehicle deceleration.

When the vehicle engine is experiencing a load that is less than full-load (i.e., somewhere in between no-load and full-load) an assumption is made that the turbo boost pressure increases linearly with the load being experienced by the engine. Thus, when the load being experienced is somewhere between no-load and full-load, the pressure vs. time shift modulation profile is modified (i.e., reduced) by the percent value of full-load which the boost pressure signal from the pressure sensor 20 is indicating. For example, if the boost pressure sensor 20 is generating a boost pressure signal which is approximately 50% of the boost pressure signal which is generated under full load, then it is assumed that the load being experienced by the engine is approximately half of that which would be experienced under full-load. The PWM duty cycle is then modified by the controller 12 to produce a pressure versus time shift modulation profile which causes the appropriate on-coming directional clutch to engage at a rate of engagement, for an appropriate time period, which is approximately 50% of that rate at which it would engage if under a full-load condition, and for approximately half the predetermined full-load time period. Similarly, if the boost pressure signal from the sensor 20 was approximately 75% of the full-load boost pressure signal, then a duty cycle would be generated which causes the appropriate on-coming clutch to engage at a rate of engagement, and for a time period, which are approximately 75% that of the rate and time that would be utilized under a full-load shift condition.

From the above, it can be seen that by first determining the boost pressures under full-load and no-load conditions, the load at which the engine is operating under at any given time can then be sensed through the instantaneous boost pressure if that boost pressure signal is rationalized as a percentage of the full-load boost pressure signal. The turbo boost pressure generated can thus be utilized to provide a very good indication of the load at which the engine is operating under and, therefore, the rapidness of the shift which should be executed to prevent unwanted vehicle lurch, jolt or sudden deceleration.

BOOST CALIBRATION PROCEDURE

Figure 3:
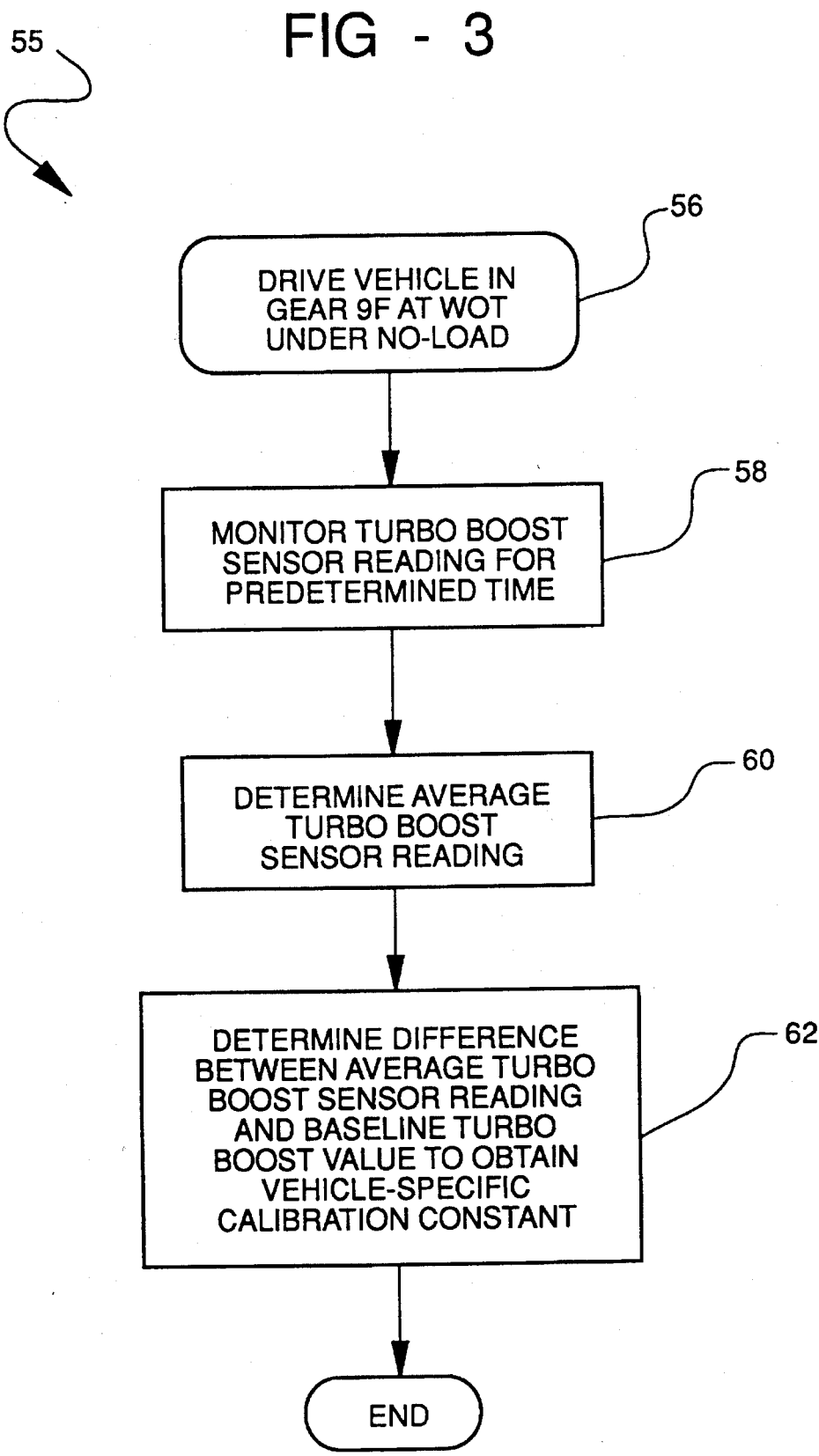
FIG. 3 is a flow chart of a calibration procedure used to obtain a vehicle specific calibration constant to be added to the turbo boost signal to compensate for variations in the turbo boost pressure from vehicle to vehicle.

To improve the vehicle-to-vehicle consistency of loaded shifts, the turbo boost sensor 20 (FIG. 1) is calibrated preferably "on-vehicle". Referring to FIG. 3, this procedure is shown in simplified form in connection with flow chart 55. A more detailed explanation of this calibration procedure will be provided in connection with the flow chart of FIG. 9. Initially, the vehicle is driven on a level surface under a full-throttle, no-load condition in gear 9F, as indicated at step 56. The turbo boost sensor 20 is then monitored for a predetermined time, for example, preferably about three seconds, as indicated at step 58. Multiple readings of the turbo boost sensor 20 are taken during this time period. Next, an "average" turbo boost sensor reading is determined, as indicated at step 60, from the multiple readings obtained at step 58. Next, the difference between a predetermined "baseline" turbo boost value and the average turbo boost sensor reading is determined, as indicated at step 62, which represents the variation of the average turbo boost sensor reading from the predetermined, baseline value. This difference (i.e., offset) represents a vehicle-specific calibration constant which takes into account the variations caused by tolerance differences in the system hardware, the turbo boost pressure sensor 20 itself, the engine itself, and virtually any other factor that influences the reading of the boost sensor 20.

BASIC OPERATIONAL OVERVIEW

Figure 4:
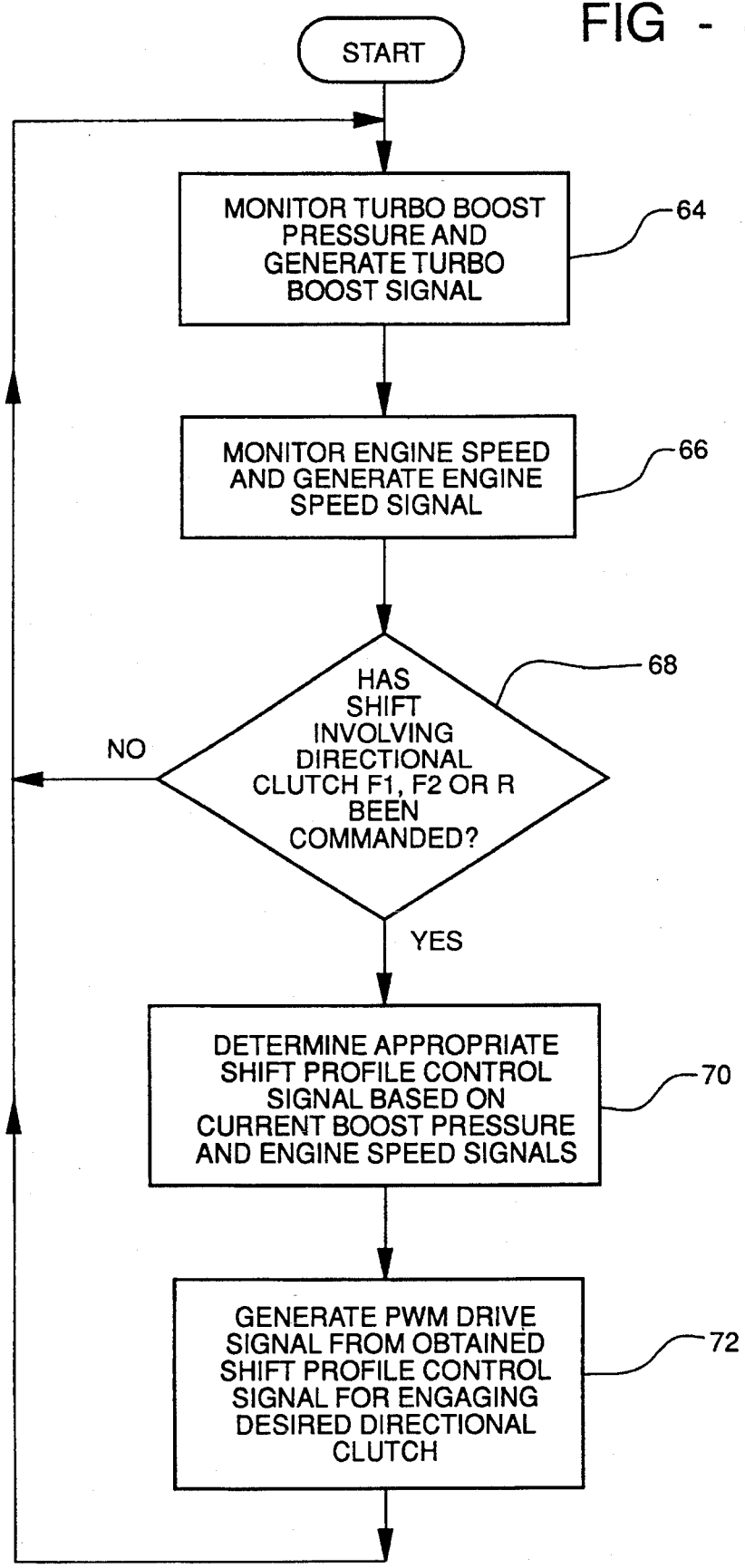
FIG. 4 is a simplified flow chart of the basic steps performed by the preferred method of the present invention showing the optional step of monitoring the engine speed and generating the engine speed signal by which the sensed turbo boost pressure can be further modified to compensate for decreasing boost pressure when the engine rpm drops due to the engine lugging down from excessive load.

Before explaining in significant detail the numerous steps implemented during operation of the preferred methods of the present invention, a simplified overview of the steps performed is presented in FIG. 4. Initially, the controller 12 monitors the turbo boost pressure from the boost sensor 20 and generates a turbo boost signal indicative of the boost pressure being developed by the turbocharger of the vehicle engine, as indicated at step 64. Next, an engine speed signal is read from the engine speed sensor 22 (FIG. 1), as indicated at step 66. Step 66 is optional but preferred in view of the fact that the turbo boost pressure typically falls off slightly when the engine is operated under load conditions which exceed the peak torque output of the engine. Put differently, as the load on the engine increases, a point will be reached where the engine is producing peak torque, which will also represent the maximum boost pressure generated by the turbocharger. If the load is increased beyond this point, the engine rpm will drop slightly, which will also cause the boost pressure to drop slightly. This is an undesirable condition as the controller 12 would sense that the load on the vehicle, and thus the engine, is decreasing when in fact the load is actually increasing, unless this situation is compensated for. This will be explained in more detail momentarily.

Returning to FIG. 4, the controller 12 determines if a shift involving directional clutch F1, F2 or R has been commanded by the operator, as indicated at step 68. If not, the turbo boost pressure signal and engine speed signal are updated, as indicated at steps 64 and 66. If so, the controller 12 determines the appropriate shift modulation profile, as indicated at step 70, based on the sensed turbo boost signal and the engine speed signal.

With further reference to step 70 of FIG. 4, at this point the controller 12 determines from a look-up table stored in its internal ROM an appropriate engine speed "constant" value which compensates for the drop in turbo boost which would occur if the engine speed has begun to drop. In other words, if the engine is being loaded such that peak torque has been exceeded (i.e., the torque has thus begun to drop), then the monitored turbo boost signal is multiplied by the engine speed constant to keep the turbo boost signal from dropping and thereby erroneously indicating to the controller 12 that the load of the vehicle is decreasing, when in fact the load is increasing. This will be explained more fully in connection with the flow chart of FIG. 9.

Lastly, the controller 12 generates the PWM drive signal with an appropriate duty cycle, for an appropriate time, in accordance with the shift modulation profile (either full-load or no-load) for the appropriate directional clutch. This then causes the appropriate directional clutch to be modulated into engagement at the appropriate rate of engagement depending upon the vehicle load. Thus, by determining the turbo boost pressure being generated at a given time and the engine speed of the vehicle at the same time, a very good approximation of the engine load can be determined, which can then be used to determine the appropriate rate of engagement of the on-coming directional clutch when a shift is made.

It will be appreciated that while the turbo boost pressure is assumed to represent purely drawbar load, that the methods described herein could readily be modified by those skilled in the art to avoid compensating for load imposed on the engine by a power take-off (PTO). This could readily be accomplished provided a suitable torque sensor is used to monitor the torque of the PTO and by factoring in the sensed PTO torque, at a given time, into the sensed turbo boost pressure value. As an example, it may not be desirable to execute a rapid shift, which would normally be produced when a rear maximum boost pressure signal is present, if it is determined that a large amount of engine power is being used to drive the PTO of the engine and the vehicle is travelling at a relatively low ground speed. In this instance it would be more desirable to modify the PWM drive signal to provide a more gradual degree of clutch engagement.

DETAILED OPERATION

Figure 5:
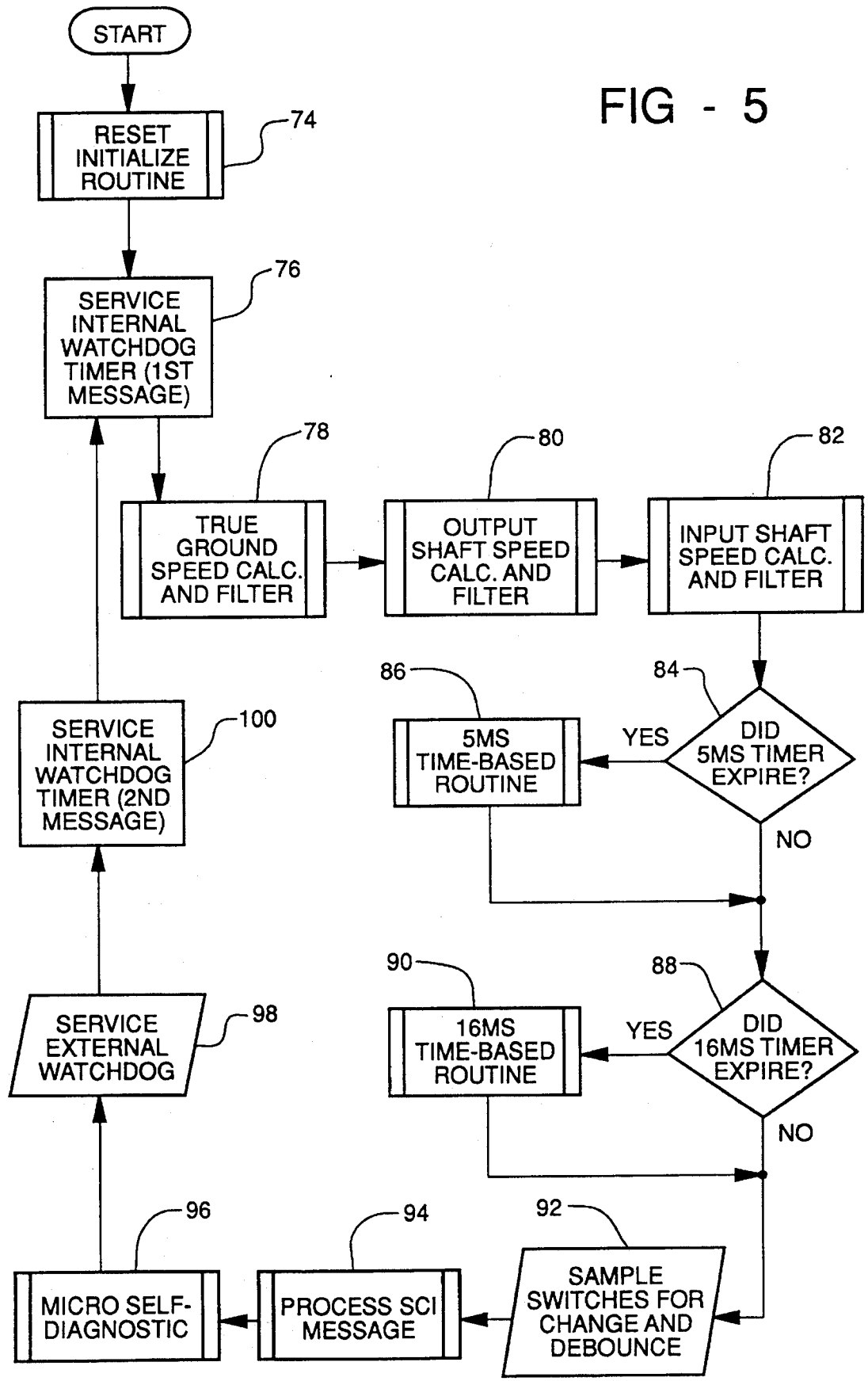
FIG. 5 is a flow chart of the main loop of the software program used to implement the preferred method of the present invention.

Referring now to FIGS. 5–12, the detailed operation of the preferred methods of the present invention will be discussed. Referring to the flow chart of FIG. 1, the overall sequence of steps performed by the software used to implement the methods of the present invention is shown. FIG. 5 thus represents one complete cycle which is performed by the controller 12, which will be referred to hereafter as the microprocessor 12. The execution time of the steps illustrated in FIG. 5 rarely exceeds 4 ms, and many times is less than 1 ms.

The first step is the execution of a "reset initialize" routine, as indicated at step 74. On power-up (or any other reset condition), the registers of the microprocessor 12 are configured as required. The outputs of the microprocessor 12 are configured to an initial reset state. The interrupts of the microprocessor 12 are disabled, but the interrupt masks are configured as desired. The checksum of the operational code associated with the software of the present invention is calculated and verified to ensure no memory upsets have occurred. If the checksum fails, the microprocessor 12 will not execute any additional software code.

With continued reference to step 74 of FIG. 5, the internal microprocessor RAM 16 is tested and set to zero. If any of the RAM tests fail, the microprocessor 12 will not execute any additional software code. Further necessary information is retrieved from the microprocessor's internal EEPROM 18. This information includes the maximum forward gear desired (for example, 18 when using the Funk 8000 series transmission), vehicle specific clutch calibration values for F1, F2 and R clutches, the inching pedal position sensor 26 minimum and maximum voltage readings, and the turbo boost sensor 20 calibration values. All fault codes are also cleared. The microprocessor's internal EEPROM-based CONFIG register is checked to ensure proper operation of the controller. If the CONFIG register is not correct, the software of the invention will attempt to reprogram this register, and program execution will continue. The internal timers are configured as required and the interrupts are enabled as configured. The transmission of the vehicle is set to neutral and the default forward and reverse gears are initialized as desired. In the preferred embodiment the default forward gear is sixth gear and the default reverse gear is third gear reverse.

Referring now to FIG. 5, step 76, the software begins executing the steps of the main loop, which comprises steps 76–100. At step 76, the microprocessor's 12 internal watchdog timer is serviced. The watchdog service messages are stored in two RAM locations which are initialized in the reset initialize routine (step 74). The first watchdog service byte is written to the watchdog at the beginning of the main loop. The second message is written at step 100, at the end of the main loop. Once out of the reset routine (step 74), no other watchdog service points are present. This ensures that the software is executing the complete loop and that the time through the loop is not excessive. In addition, by having the watchdog service values in RAM, it is possible to recover from RAM upsets through the internal watchdog resets if the wrong values are written. This also ensures that the microprocessor 12 has gone through a valid reset before execution of code is allowed. For increased security, these two values are preferably placed at the end of user RAM so that any stack overflows in the microprocessor 12 will overwrite these values, and execution of the software will be stopped by the watchdog reset from these messages being corrupted.

With continued reference to FIG. 5, at step 78 the microprocessor 12 reads the port coupled to the optional radar horn 40, if such a device is being used. This provides a true ground speed signal to the microprocessor 12 should same be desirable for any purpose. It will be appreciated, however, that this step is optional and is not essential to the main loop.

At step 80, the speed of the output shaft of the powershift transmission is determined by reading the port coupled to the output shaft speed sensor 41. As stated earlier, the signal of the output shaft speed sensor, which is a VRMP sensor, is equivalent to about 1.2 Hz per rpm. Approximate wheel speed is calculated by assuming that at about 151.48 rpm the vehicle is traveling at 1.0 mph. Those skilled in the art will appreciate, however, that wheel size will affect this calculation as will tire wear.

At step 82, the input shaft speed is calculated and filtered. This is accomplished by the microprocessor 12 reading the port coupled to the input shaft VRMP (i.e, engine speed sensor 22). At step 84, an inquiry is made to determine if a 5 ms timer started immediately after the reset initialize routine (step 74) has expired. If so, a 5 ms time-based routine is executed, as indicated at step 86 before the next step in the main loop is executed. The 5 ms time-based routine will be described in greater detail momentarily. Essentially, however, this routine involves performing certain diagnostics, updating the values from the microprocessor's 12 internal A/D converter 14 and checking for various faults of any of the output drivers or solenoids.

With continued reference to FIG. 5, the software checks to determine if a 16 ms timer configured in software has expired, as indicated at step 88. This timer is also started immediately after the reset initialize routine (step 74). If the 16 ms timer has expired, a 16 ms time-based routine is executed, as indicated at step 90. Briefly, this routine involves checking and updating a number of operational parameters involving the present state of switches which indicate the position of the shift lever 36 (i.e., what gear ratio and directional mode is commanded), performing engine speed compensation calculations involving the engine speed compensation values, scaling the turbo boost sensor reading based on the turbo boost calibration value, and other operations. This routine will also be discussed in more detail momentarily.

After the 16 ms timer has expired or the routine at step 90 has been performed, the digital switch inputs of the microprocessor 12 are sampled and the results are used to determine when any switch associated with the shift lever 36 has changed state and has been debounced in a separate time-based debounce loop, as indicated at step 90. The specifics of this debounce loop are disclosed in co-pending U.S. application Ser. No. 08/077,572, filed on Jun. 15, 1993, and entitled GEARSHIFT MECHANISM. This application is hereby incorporated by reference.

Next, the serial communications interface port is polled by the microprocessor 12 to see if a message has been received thereat by any external device in communication with the microprocessor 12. If it has, the message request is processed, a response message is formed, and the transmission of the response is initiated, all as indicated at step 94. In this regard it will be appreciated that since the microprocessor 12 is afforded the capability of serial communications, the microprocessor 12 can be interfaced with an external development tool should one wish to reprogram any of the stored constants, such as the engine speed compensation values, should this be desirable.

At step 96, a micro self-diagnostic routine is executed which refreshes the control registers and performs various tests on the RAM of the system, in addition to performing other routine tests for the microprocessor 12. At step 98, the microprocessor 12 is required to service an external watchdog. Essentially, the microprocessor 12 is required to toggle an output port thereof within approximately 16 ms to prevent an external watchdog timer from resetting the microprocessor 12. At step 100, the second service message is written at the end of the main loop as explained hereinbefore.

Figure 6:
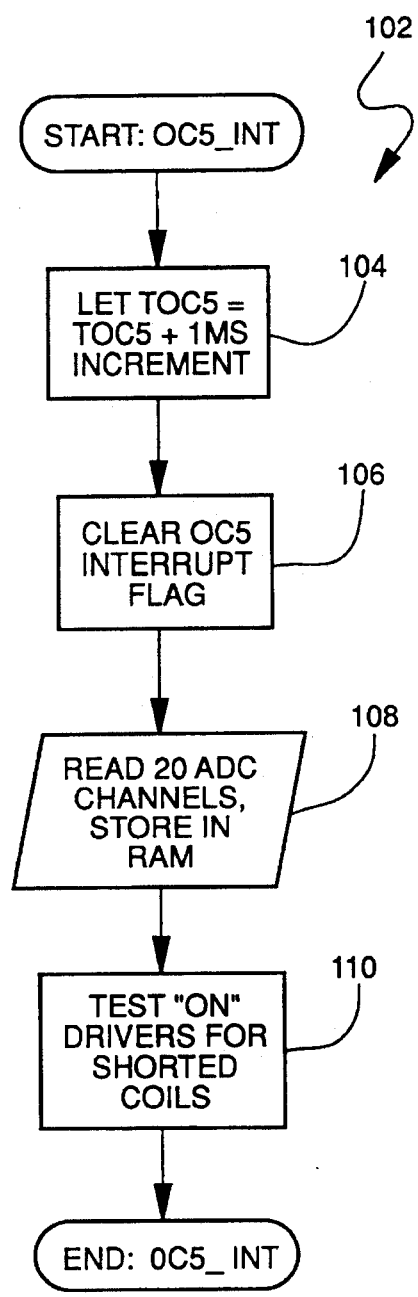
FIG. 6 is a flow chart of an interrupt routine which is used to read the channels of the A/D converter and to test the solenoids of the transmission for shorted coils.

Referring briefly now to FIG. 6, there is shown an interrupt routine 102 which is labelled the "OC5 interrupt". This interrupt occurs every 1 ms, as indicated at step 104. Immediately after the interrupt occurs, the OC5 interrupt flag is cleared, as indicated at step 106, and the internal A/D converter 14 channels are read and the results thereof stored in the RAM 16 of the microprocessor 12 (FIG. 1), as indicated at step 108. Next, the solenoid drivers which are currently "on" are tested to determine if the coil of the solenoid associated therewith is shorted, as indicated at step 110. Approximately 1 ms later, and every 1 ms thereafter, this routine is repeated.

Figure 7:
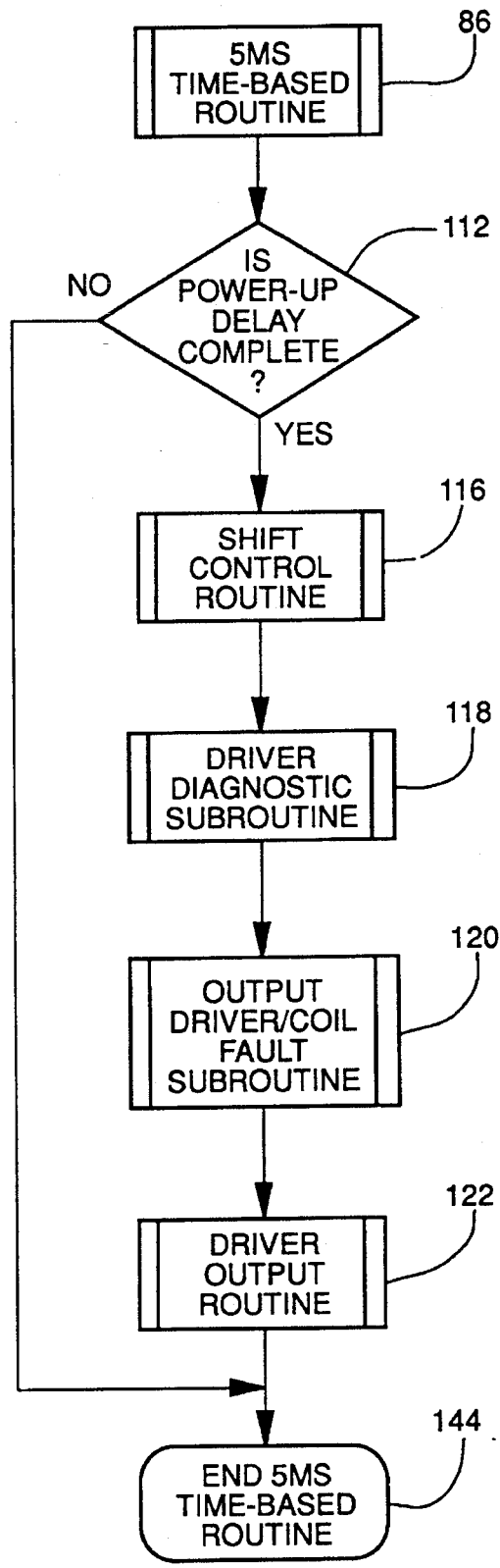
FIG. 7 is a flow chart of the steps implemented to check the solenoid coils for faults and to generate the driver output signals for the solenoid coils which need to be energized at a given time.

Referring now to FIG. 7, the 5 ms time-based routine indicated at step 86 in FIG. 5 is shown in more detail. The first step in this routine involves checking to determine if a 0.5 second delay after powerup has passed, as indicated at step 112. If not, this routine is terminated, as indicated at step 114. If the 0.5 second delay has occurred, a shift control routine is executed, as indicated at step 116. This routine essentially involves setting up and handling all of the solenoid patterns and duty cycles required to implement a shift and to maintain (i.e., refresh) the solenoids and duty cycles needed to maintain operation in the currently selected gear. Next, a driver diagnostic subroutine is executed, as indicated at step 118, which checks to determine if the solenoid drivers that need to be turned on to effect a shift are in fact functional (i.e., not shorted or open).

An output driver/coil fault subroutine is executed next, as indicated at step 120, which analyzes any faults determined to exist at step 118. The subroutine of step 120 also attempts to pick a gear which is closest to the desired gear commanded by the operator which cannot be used because of a fault with a component associated therewith. At step 122, a driver output routine is executed which causes the appropriate currents to be applied to the solenoids to be turned on to either implement a shift or maintain operation in a desired gear.

16 MS TIME BASED ROUTINE

Figure 8B:
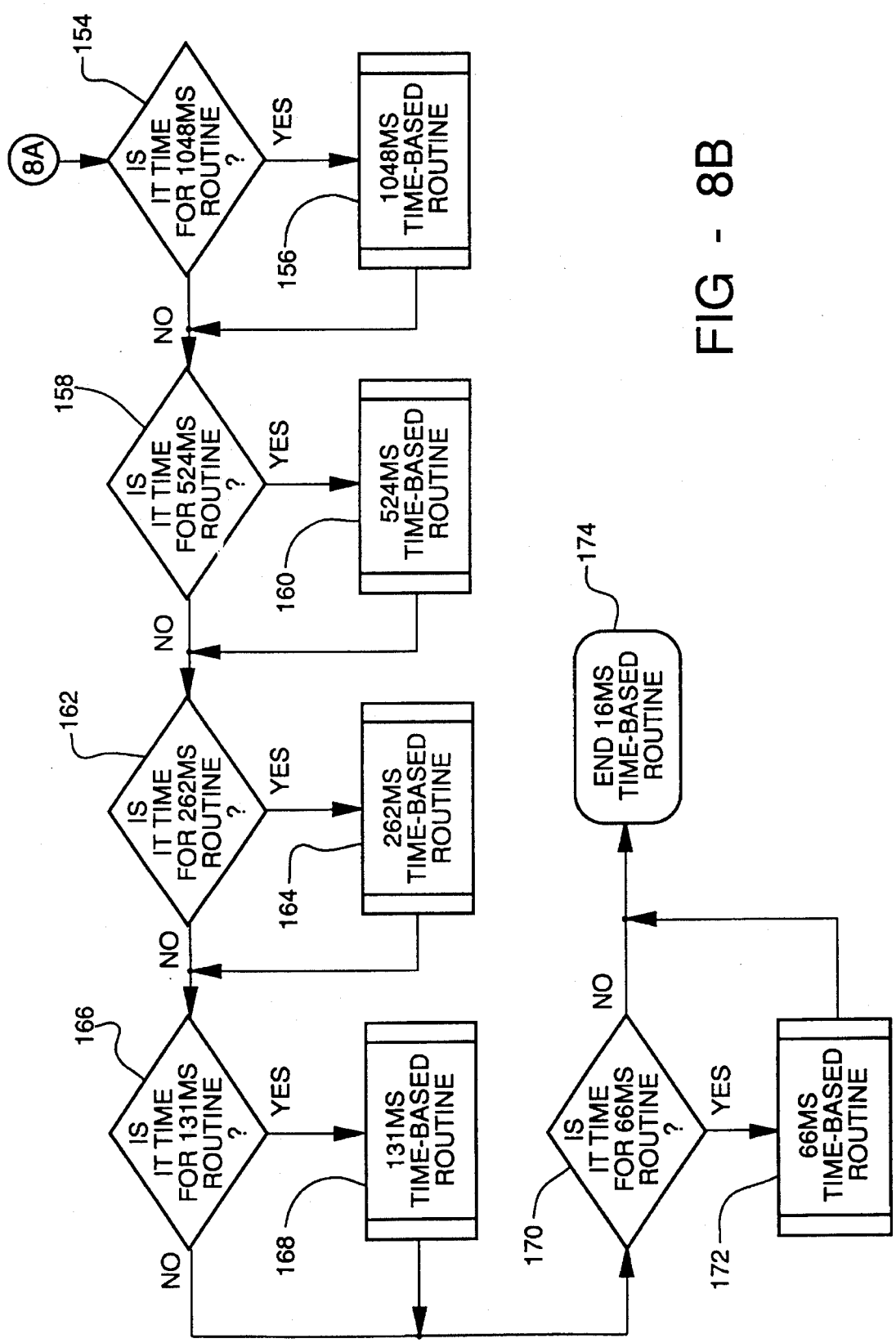
FIG. 8 is composed of FIG. 8A and 8B and is a flow chart of the 16 ms time based routine showing the various operations that are performed to check the various sensors of the system of FIG. 1.

The 16 ms time based routine which is executed at step 90 of the main loop shown in FIG. 5 is set forth in detail in FIGS. 8A and 8B. Starting with FIG. 8A at step 124, a power-up delay flag process routine is executed to ensure that a minimum predetermined time has elapsed after power, such as, for example, a 500 ms delay. At step 126, the clutch calibration values are stored in EEPROM 18 of the microprocessor 12 for the modulated clutches F1, F2 and R. These values represent the current offset values needed to just begin to cause clutch engagement. Next, at step 128 the vehicle-specific turbo boost calibration values are all stored in EEPROM 18.

At step 128, the vehicle-specific boost calibration constant (i.e., boost offset value) determined as explained in connection with FIG. 3 is stored in EEPROM 18 of the microprocessor 12. At step 130, an EEPROM service subroutine is executed to ensure that any values which need to be written to or read from the EEPROM 18 are valid.

With continued reference to FIG. 8A, at step 132 an optional calibration offset value for each of the modulated clutches F1, F2 and R will be added to the clutch calibration value stored at step 126. Step 132 represents an optional feature by which additional clutch calibration information in the form of an offset value can be added, for example, by trained service technicians, to further modify the shift characteristics of any one of the directional clutches.

With continued reference to FIG. 8A, at step 134 an "on-off hold timer" is incremented which essentially keeps track of how long the coils of the solenoid valves associated with each of the on/off clutches of the transmission are being held at 12 volts. It will be appreciated that the on/off solenoid valves each include six volt coils. However, a 12 volt DC signal is applied to each coil when it is turned on to drive the solenoid very quickly into its on position. The on/off hold timer at step 134 keeps track of how long a particular solenoid is being held at +12 volts DC. This timer is also cleared when a +12 volt DC signal is first applied to any on/off solenoid valve. The timer is incremented approximately every 16.3 ms.

Referring to step 136, a shift lever control process routine is executed which reads the switches associated with the gearshift lever 36 which indicate the position of the lever 36. This routine is explained in greater detail in U.S. application Ser. No. 08/077,572, now U.S. Pat. No. 5,388,476. It will be appreciated, however, that the routine explained in detail in U.S. application Ser. No. 08/077,572, is not essential to proper operation of the present invention but is preferably included at this point in the 16 ms time based routine 90.

With continued reference to FIG. 8A, at step 138 an engine speed compensation calculation routine is executed which modifies the duty cycle of the modulated clutches F1 and F2 based on the engine speed. This compensates for the lower hydraulic pump pressure which is generated at lower engine speeds. At step 140, an analog filtering routine is executed which filters analog voltages from the turbo boost sensor 20, the inching clutch pedal sensor 26 voltage, the feedback voltages obtained from any diagnostic sensors, and the system voltage.

At step 142 a fault control routine is executed for handling other faults that are not related to the output drivers for the solenoid valves. For example, this routine checks to ensure that the inching clutch pedal sensor 26 is not shorted to ground, that the turbo boost sensor is not shorted to ground, or that the output shaft speed sensor 41 is not malfunctioning.

With continued reference to FIG. 8A, a switch transition mode control routine is executed, as indicated at step 144, to ensure that the voltage signal from the top-of-clutch switch 27a is within acceptable limits, that if a bottom-of-clutch signal from bottom-of-clutch switch 27b is being generated that that signal is within acceptable voltage limits, and that the inching pedal potentiometer 26 (FIG. 1) is operating within valid voltage limits.

At step 146, a frequency input overflow routine is executed to set the input shaft or output shaft speeds to zero when no pulses are received by the VRMP sensor associated with each of the input and output sensors 22 and 41, respectively, and when the frequency of the pulses from each sensor falls below a predetermined lower limit. At step 148, a turbo boost process routine is executed. This routine is described in greater detail with the flow chart of FIG. 9, but essentially involves scaling the turbo boost value provided by the turbo boost sensor 20 in relation to the engine rpm to compensate for the drop in turbo boost pressure that occurs when the engine is operated at high loads which cause the engine to lug down.

Referring to step 150, an inching pedal process routine is executed to determine the duty cycle that needs to be applied to the directional clutch F1 or F2 being engaged via the clutch pedal by the operator to produce the appropriate clutch pressure based on the current pedal position. Thus, this routine determines the proper duty cycle which corresponds to the clutch pedal position at a given instant. At step 152, a shorted output diagnostic routine is executed. This routine involves sampling the voltages of energized solenoid coils every 5 ms. With every 16 ms period there will be then at least three samples taken from which it will be determined if a coil which is energized is actually shorted. If any coil is shorted, its voltage will fall below a predetermined lower limit. A diagnostic fault indication can then be provided to a display panel of the vehicle to provide an operator that a fault condition has arisen.

Referring to step 154 shown in FIG. 8B, every 1048.576 ms, the software processes certain information and performs certain fault condition checks, to be explained momentarily. Thus, at step 154, a check is made to determine if 1049 ms has elapsed. If so, a 1048 ms time based routine is executed. This routine processes an audio alarm signal which is present for about three seconds during the turbo boost calibration mode. This alarm is generated in response to an operator pressing appropriate switches on the display/keyboard 29 for a period greater than three seconds while the tractor is on a smooth level surface with its throttle at high idle and the shift lever 36 in neutral. The A/D reading of the thermistor (resister 30 shown in FIG. 1) indicating the temperature of the modulated solenoid coil is also processed and the sensed temperature is updated. The turbo boost sensor 20 reading is checked for fault conditions as is the input shaft speed sensor 22. The inching clutch pedal position sensor 26 is checked, and if needed the minimum and maximum calibration values are updated.

Once the 1048 ms time based routine is executed at step 156, or the test at step 154 proves false, then a check is made to determine if at least 524 ms has elapsed, as indicated at step 158. If so, a 524 ms time based routine is executed, as indicated at step 160. With this routine, every 524.288 ms the system voltage reading is checked for over-voltage or under-voltage conditions. The engine speed is processed to determine the proper engine speed compensation value to apply when scaling the turbo boost value.

After the routine at step 160 is executed or the test at step 158 proves false, then a check is made to determine if at least 262 ms has elapsed, as indicated at step 162. If so, a 262 ms time based routine is executed. With this routine, every 262.144 ms the shorted fault lamp diagnostics, the open solenoid coil diagnostics and the driver/solenoid feedback circuit fault diagnostics are executed. The display switch input debounce routine is executed and, if any display switches have changed and have been debounced, the corresponding switch transition is processed. Finally, the clutch overload diagnostics are performed. These diagnostics are merely checks of the input shaft speed of the transmission against the output shaft speed to determine if excessive clutch slippage is present, based on known input shaft speeds and gear ratios being used.

If the test at step 162 proves false or the routine at step 164 is executed, a check is made to determine if at least 131 ms has elapsed, as indicated at step 166. If so a 131 ms time based routine is executed, as indicated at step 168. With this routine, every 131.072 ms, the serial data stream containing the display switch information is received from the display. Every other loop the updated display information is sent to the display. The shift lever switch drop-out diagnostics and shorted output driver diagnostics are performed. The status of a park-lock bulb is updated as is the status of the audio alarm. The engine speed and vehicle acceleration values are calculated and the maximum duty cycles to apply to the solenoids are calculated based on the filtered system voltage readings. The calculated engine speed and vehicle acceleration values are used during shuttle-shifting by the microprocessor 12 to help select the appropriate gear, based on engine speed acceleration and vehicle speed acceleration, to shift into which is closest to the gear selected by the operator.

If the routine at step 168 has been performed or the test at step 166 proves false, then a check is made to determine if 66 ms has elapsed, as indicated at step 170. If this test proves true, then a 66 ms time based routine is executed as indicated at step 172. With this routine, every 65.536 ms the inching pedal diagnostics are executed together with the input and output shaft speed sensor diagnostics. Once this routine has been concluded, or the test at step 170 proves false, the 16 ms time based routine ends, as indicated at step 174.

Figure 9:
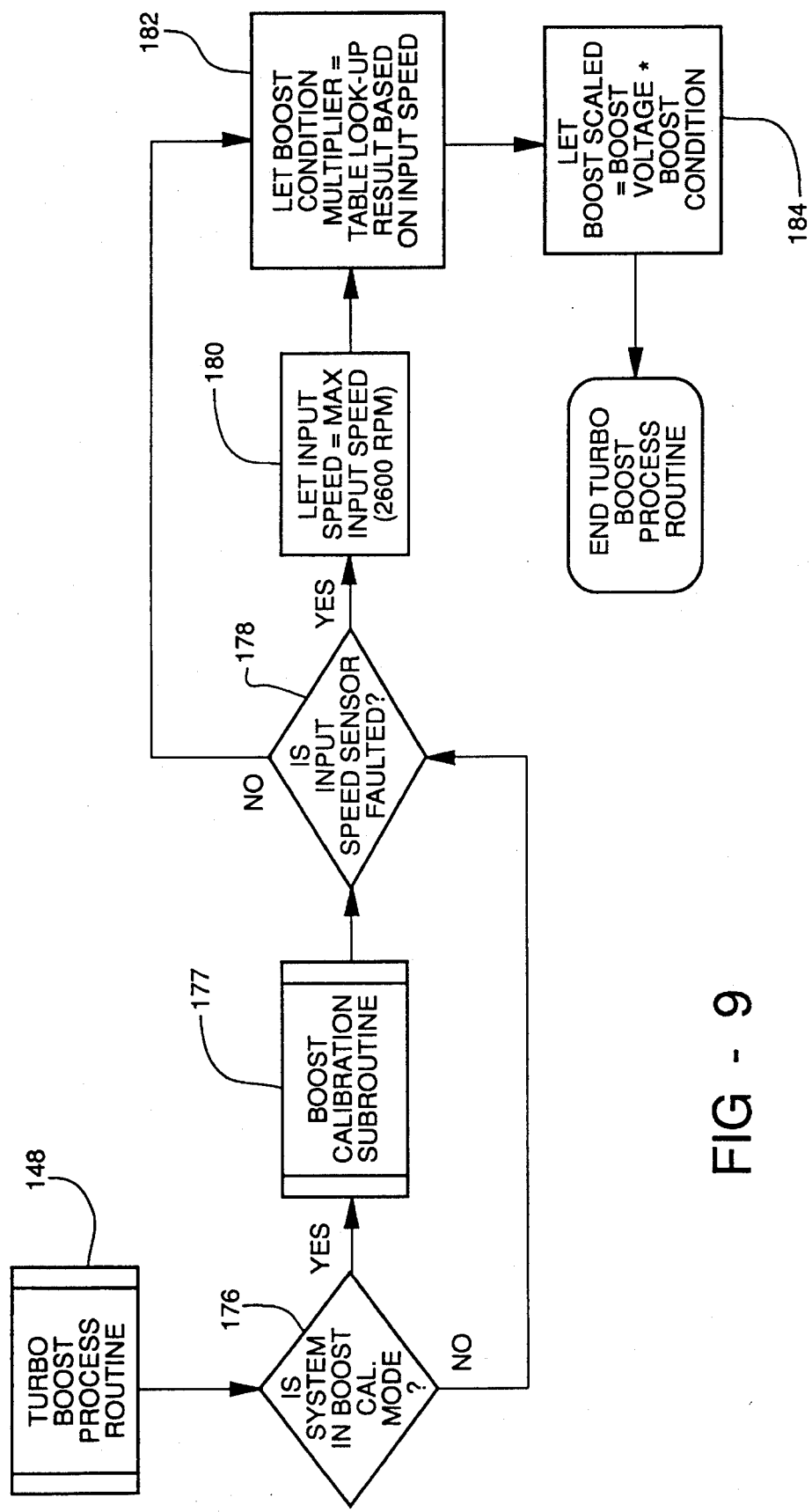
FIG. 9 is a flow chart of the turbo boost process routine for determining a compensated turbo boost value which takes into account the engine speed of the vehicle.

Referring now to FIG. 9, the turbo boost process routine executed at step 148 in FIG. 8 is shown in greater detail. Initially, the software determines if the system is in the boost calibration mode, as indicated at step 176. The boost calibration mode is preferably initiated via a display mounted control. If the calibration mode has been selected by the operator or a service technician, then the boost calibration subroutine (routine 55 of FIG. 3) is executed, as indicated at step 177.

With further reference to FIG. 9, a check is next made to determine if the engine speed sensor 22 (FIG. 1) is faulted, as indicated at step 178. If so, the input shaft speed of the transmission is assumed to be at a maximum input shaft speed of, for example, about 2,600 rpm, as indicated at step 180. It will be appreciated that this maximum input shaft speed value may vary depending upon the engine and/or the vehicle being used.

Next, the sensed turbo boost value, which now represents a "normalized" value after being modified by the vehicle specific calibration constant, is further modified by multiplying it by an appropriate one of a plurality of engine speed constants. The engine speed constants are stored in a look-up table, as indicated at step 182, and compensate for situations where the engine has begun to "lug down", thus causing the turbo boost pressure value sensed by the sensor 20 (FIG. 1) to drop. As explained briefly herein, the boost signal sensed by the sensor 20 increases, it is assumed linearly, as engine rpm increases. However, when the load on the vehicle becomes so great such that the engine begins to lug down, the dropping engine rpm will cause a reduction in the boost pressure generated by the engine's turbocharger. If this situation were not compensated for, the microprocessor 12 would determine, erroneously, that the load is dropping when in fact the load is actually increasing on the vehicle. Thus, the microprocessor 12 would determine that the vehicle is more lightly loaded and cause the improper duty cycle to be used for the PWM drive signal used to modulate the appropriate clutch into engagement. By multiplying the normalized boost value by the appropriate engine speed constant, the drop in turbo boost pressure that occurs as the engine begins to lug down is compensated for. In FIG. 10, it can be seen that the multiplier for the turbo boost value below 2100 rpm increases as the engine rpm decreases. In this example, 2100 rpm represents the engine speed at which the engine produces its peak torque under full-load. As the engine begins to lug down due to an external load on the vehicle, the value of the boost multiplier increases. With reference again to FIG. 9, at step 184 the normalized boost pressure value is multiplied by the engine speed constant to achieve a "conditioned" turbo boost value.

Figure 11A:
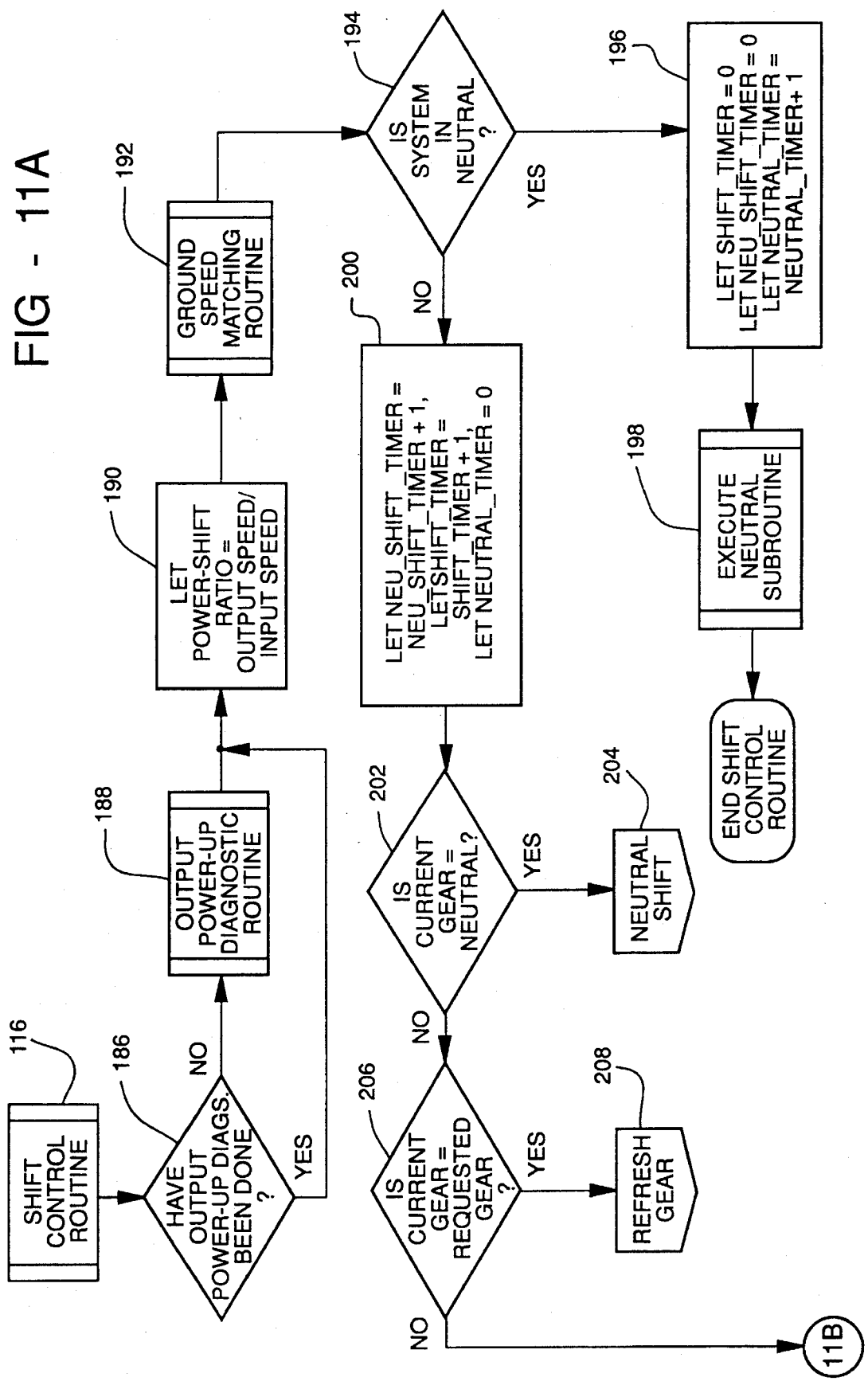
FIG. 11 is composed of FIGS. 11A and 11B and is a flow chart of the steps performed in the shift control routine of the present invention.
Figure 11B:
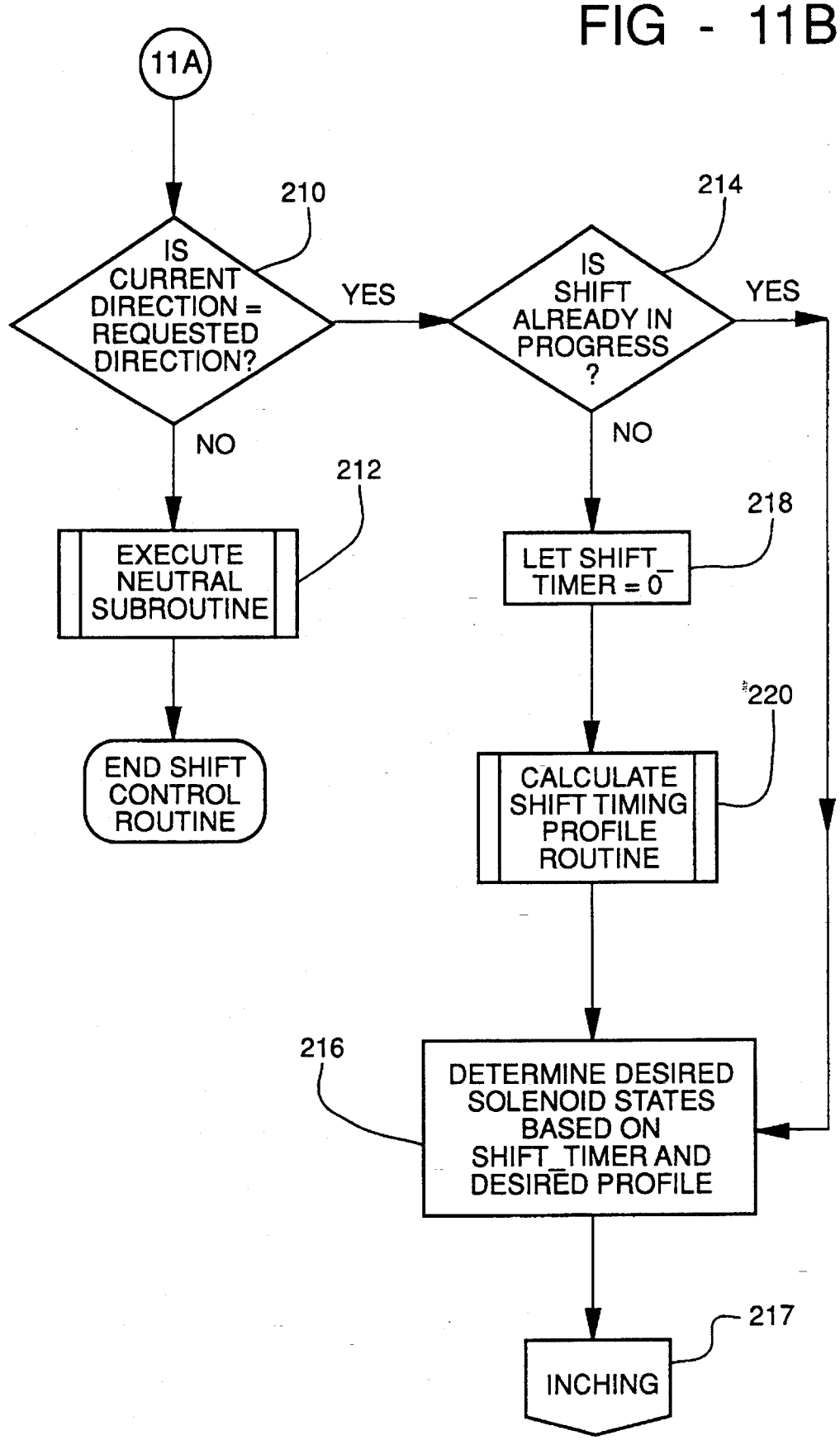

Referring now to FIGS. 11A and 11B, the shift control routine denoted at step 116 in FIG. 7 is described in greater detail. Referring first to step 186 in FIG. 11A, a check is made to determine if the output power-up diagnostics have been performed. These diagnostics involve having the microprocessor 12 briefly turn on each solenoid valve, one at a time, to ensure that there are no shorted control lines going to the coils of each of the solenoid valves. It will be noted that energizing one solenoid valve at a time with the Funk 8000 series transmission will not cause any shifting to occur.

At step 188, the solenoids are actually turned on, one at a time, with appropriate drive signals from the microprocessor 12, if the output power-up diagnostics have not previously been performed. With continuing reference to FIG. 6, at step 190 the powershift ratio is determined by dividing the sensed output shaft speed by the sensed input shaft speed. At step 192 a ground speed matching routine is executed. This routine is implemented to avoid any possible damage to the directional clutches when a shift is commanded by the operator to a gear ratio which differs by more than one gear from the gear ratio the transmission is presently in. For example, if a shift from gear 5F to 9F is commanded by the operator, this routine will cause the powershift transmission 23 to first shift into the gear which is closest in ratio to the gear ratio which the transmission was previously in. This ensures that the shifting between widely varying gear ratios will not cause unnecessary lurching or jolting of the vehicle or damage to the directional clutches of the transmission 23.

Referring to step 194, a check is next made to determine if the transmission is in neutral. This is accomplished by determining if either the operator has the clutch pedal 26 depressed completely such that the bottom-of-clutch pedal sensor 27b is indicating same or the shift lever 36 of the transmission 23 has been placed in neutral, as detected by the neutral detection switch 28. If the transmission is detected to be in neutral, a shift timer is set to zero, a neutral shift timer is set to zero and a neutral timer is incremented, all as indicated at step 196. Subsequently, a neutral subroutine is executed, as indicated at step 198, to place the transmission 23 in neutral.

With further reference to FIG. 11A, if the transmission 23 is not detected to be in neutral, as checked at step 194, the neutral shift timer is incremented by one, the shift timer is also incremented by one and the neutral timer is set to zero, as indicated at step 200. This step essentially keeps track of how long the shift lever 36 has been out of the neutral position. At step 202, a check is made to determine if the current gear is neutral and, if so, a neutral shift is executed as indicated at step 204. If the current gear is not set to neutral, a check is made to determine if the current gear is equal to the gear requested, as indicated at step 206. Put differently, this checks to determine if the position of the shift lever 36 is still indicating the same gear ratio that the transmission is presently in. If this test proves true, then the system checks to ensure that the solenoids that should be on to maintain the transmission in the desired gear ratio are in fact on, and that the solenoids that should be off are in fact off, as indicated at step 208.

With continuing reference to FIG. 11A and now also to FIG. 11B, if the test at step 206 is determined to be false, then a check is made to determine if the shift that has been commanded by the operator is either from one forward gear to another forward gear or from one reverse gear to another reverse gear, as indicated at step 210. If this test proves false, then it is determined that a shift into neutral has been commanded and the neutral shift subroutine is executed, as indicated at step 212. It will be appreciated that this is the same neutral shift subroutine that would have been commanded at step 198 had it been determined at step 194 that the transmission was in neutral.

If the test at step 210 indicates that either a shift from one forward gear to another has been commanded or a shift from one reverse gear to another reverse gear has been commanded, a check is made to determine if the commanded shift is already in progress, as indicated at step 214. If so, the microprocessor 12 determines the appropriate PWM duty cycles and solenoid actuation patterns based on how far the controller is into executing the shift, as all indicated at step 216. Subsequently, at step 217 the inching clutch pedal sensor 26 is checked by the microprocessor 12 and if this pedal is being engaged by the operator the microprocessor 12 uses the signal generated by the sensor 26 to override the PWM drive signal which would normally be applied to modulate the involved directional clutch into engagement to complete the shift. Thus, the operator is always afforded the capability of overriding the modulation signal that would be applied to the involved directional clutch if a condition exists where an even slower or more rapid clutch engagement is desired than what would otherwise be commanded by the microprocessor 12.

Referring again to step 214, if it is determined that no shift is already in progress, then the shift timer is set equal to zero, as indicated at step 218, and the appropriate PWM drive signal is determined based on the compensated turbo boost value, as indicated at step 220 which is called the calculated shift timing profile routine.

TURBO BOOST PRESSURE SCALING

Figure 12:
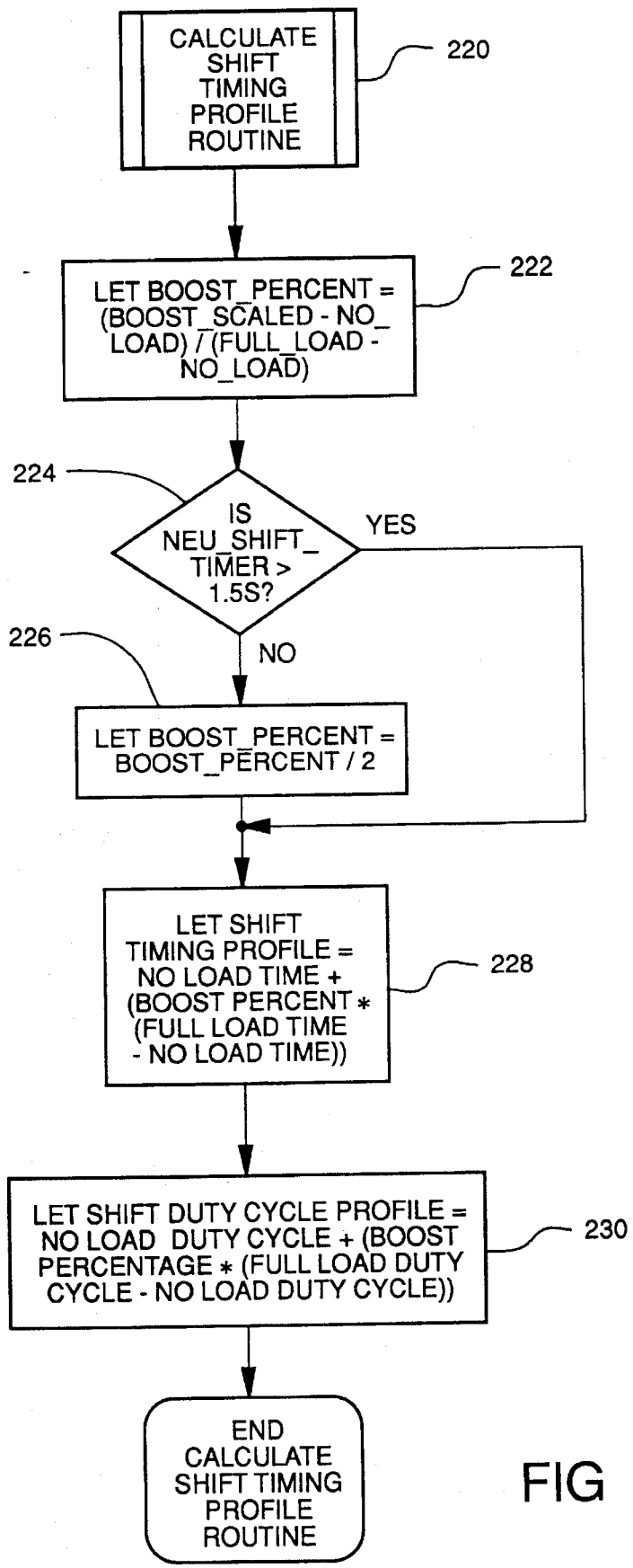
FIG. 12 is a flow chart showing the steps performed in the shift timing profile routine which is used to determine the appropriate PWM duty cycle and time interval for the percentage of full-load being experienced by the engine when making a shift involving directional clutches F1 or F2.

Referring now to FIG. 12, the turbo boost shift timing profile routine executed at step 220 in FIG. 11 is shown in greater detail. Initially, at step 222, the compensated turbo boost value obtained at step 184 in FIG. 9 is compared to the predetermined no-load and full-load turbo boost values. This is accomplished by the following formula:

$$\text{Boost Percentage} = \frac{T_{comp} - Tnorm_{no-load}}{Tnorm_{full-load} - Tnorm_{no-load}}$$

where: $T_{comp}$=compensated turbo boost value;

$Tnorm_{no-load}$=normalized turbo boost value under no-load; and $Tnorm_{full-load}$=normalized turbo boost value under full-load.

Essentially, the calculation at step 222 determines what percent of full-load the engine is experiencing by comparing the compensated turbo boost value with the predetermined full-load and no-load normalized turbo boost values. By this calculation the microprocessor 12 can determine what percent of full-load the engine is experiencing at any given time based on the compensated turbo boost value determined at the time and the known no-load and full-load turbo boost values.

With further reference to FIG. 12, at step 224 a check is made to determine if the neutral shift timer value is greater than about 1.5 seconds. By this check the microprocessor 12 determines that the transmission has been in neutral for at least a predetermined time. If this test proves true then it is determined that the transmission has not just been shifted out of neutral and that any load being experienced by the engine is due to static drawbar load (i.e., not dynamic load). If this test proves false then it is assumed that the vehicle is accelerating from a stand still and that the load being experienced by the engine is simply that load which is experienced in simply getting the vehicle up to the desired speed. In this instance, as indicated at step 226, it is assumed that the true boost percent is one-half of the boost percentage value calculated at step 222.

With further reference to FIG. 12, at step 228 the desired time value in which the shift is to be completed is determined based on either the boost percentage value calculated at step 222 or the modified value determined at step 226. This is accomplished by the following formula:

Shift timing profile=No-load time+(boost percent (predetermined full-load time−predetermined no-load time)).

Referring now to step 230, the appropriate duty cycle for the PWM drive signal is determined. This determination is made in accordance with the following formula:

Duty cycle=no-load duty cycle+(boost percent (full-load duty cycle−no-load duty cycle)).

The calculation at step 230 determines what duty cycle is required to bring the on-coming directional clutch into complete engagement in the time period determined at step 228. Together, steps 228 and 230 determine the appropriate percentage of the full-load pressure and full-load time values that need to be used to generate the PWM drive signal for modulating the on-coming directional clutch into engagement in accordance with the load being experienced by the engine, as indicated by the compensated turbo boost value. Thus, if the compensated turbo boost value is 50% of that which would be sensed if the engine was operating under a full-load condition, then 50% of the full-load pressure and full-load time values would be used to generate the PWM drive signal.

Figure 14:
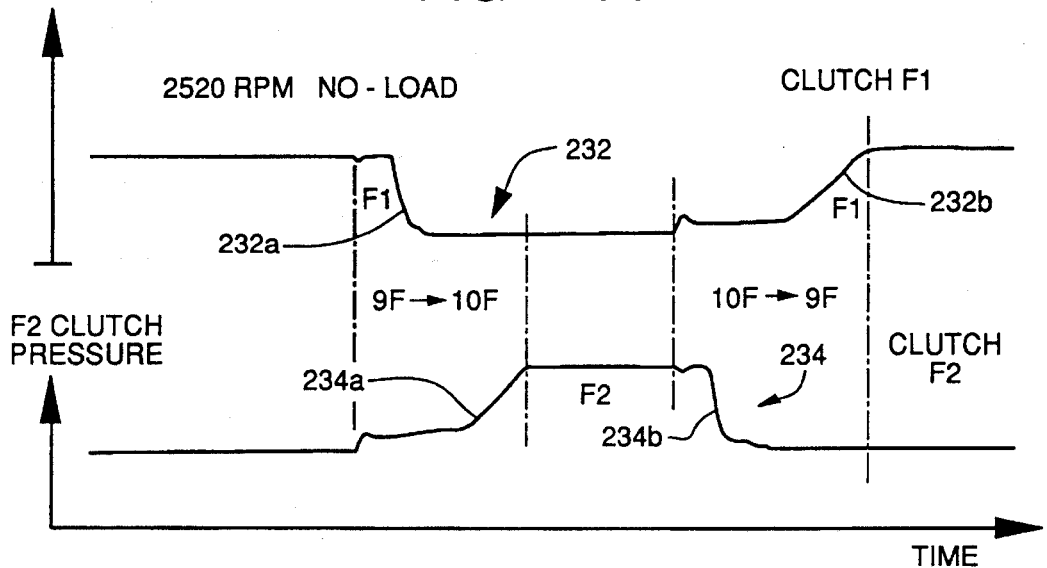
FIG. 14 is a pair of graphs of the pressure over time to the clutches F1 and F2 illustrating the rate of engagement of these clutches under a no-load condition.
Figure 15:
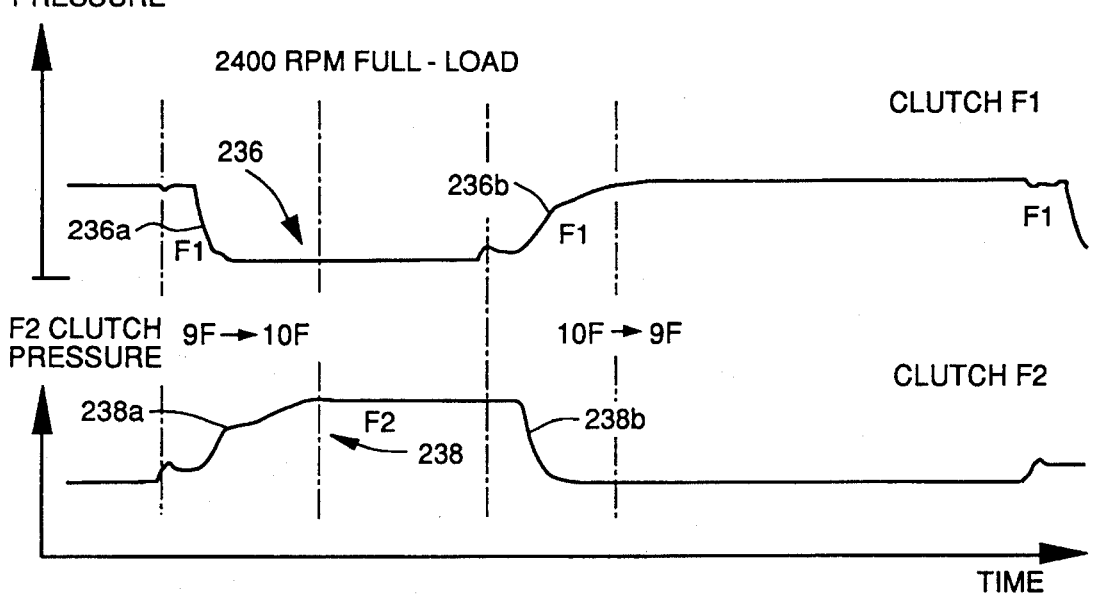
FIG. 15 is a graph of the pressure over time used to modulate the F1 and F2 directional clutches illustrating their respective rates of engagement under a full-load condition.

Referring briefly now to FIGS. 14 and 15, it can be seen from the graphs shown therein how the on-coming directional clutch is modulated more quickly into engagement at higher engine loads. Referring now specifically to FIG. 14, the top graph 232 represents the pressure to the off-going directional clutch F1 overtime during a shift from gear 9F to gear 10F, as indicated by curve 232a, and a shift from gear 10F to gear 9F as indicated by curve 232b. The bottom waveform 234 indicates the pressure produced to modulate the directional clutch F2 when this clutch comes on, as indicated at waveform portion 234a during a shift from gear 9F to gear 10F. Portion 234b of this waveform indicates the rapid fall off in pressure to the off-going F2 directional clutch when a shift from gear 10F to gear 9F is made. The graphs of FIG. 14 represent the performance of the F1 and F2 directional clutches with an engine of the vehicle operating at approximately 2520 rpm under a no-load condition.

Referring now to FIG. 15, the pressure waveform for off-going directional clutch F1 is shown by waveform 236 and the pressure applied to on-coming clutch F2 is shown by waveform 238. In the graphs of FIG. 15, the engine rpm is at 2400 with the engine fully loaded. Portion 236a of waveform 236 and portion 238a of waveform 238 indicate the pressure applied to these two directional clutches during a shift from gear 9F to gear 10F. Similarly, portion 236*b* of waveform 236 and portion 238*b* of waveform 238 indicate the pressures to the directional clutches F1 and F2 during a shift from gear 10F to gear 9F.

When comparing portion 234*a* of waveform 234 in FIG. 14 with portion 238*a* of waveform 238*a* in FIG. 15, it can be seen that the pressure used to modulate to the on-coming directional clutch is ramped up at a greater rate when the engine load increases and the engine rpm has decreased. This is also illustrated by comparing portion 232*b* of waveform 232 with portion 236*b* of waveform 236. In this instance clutch F1 is the on-coming directional clutch. It can be seen that clutch F1 comes on much more rapidly (i.e., at a greater rate of engagement) when the engine is loaded than when the engine is operating under no-load.

Figure 13:
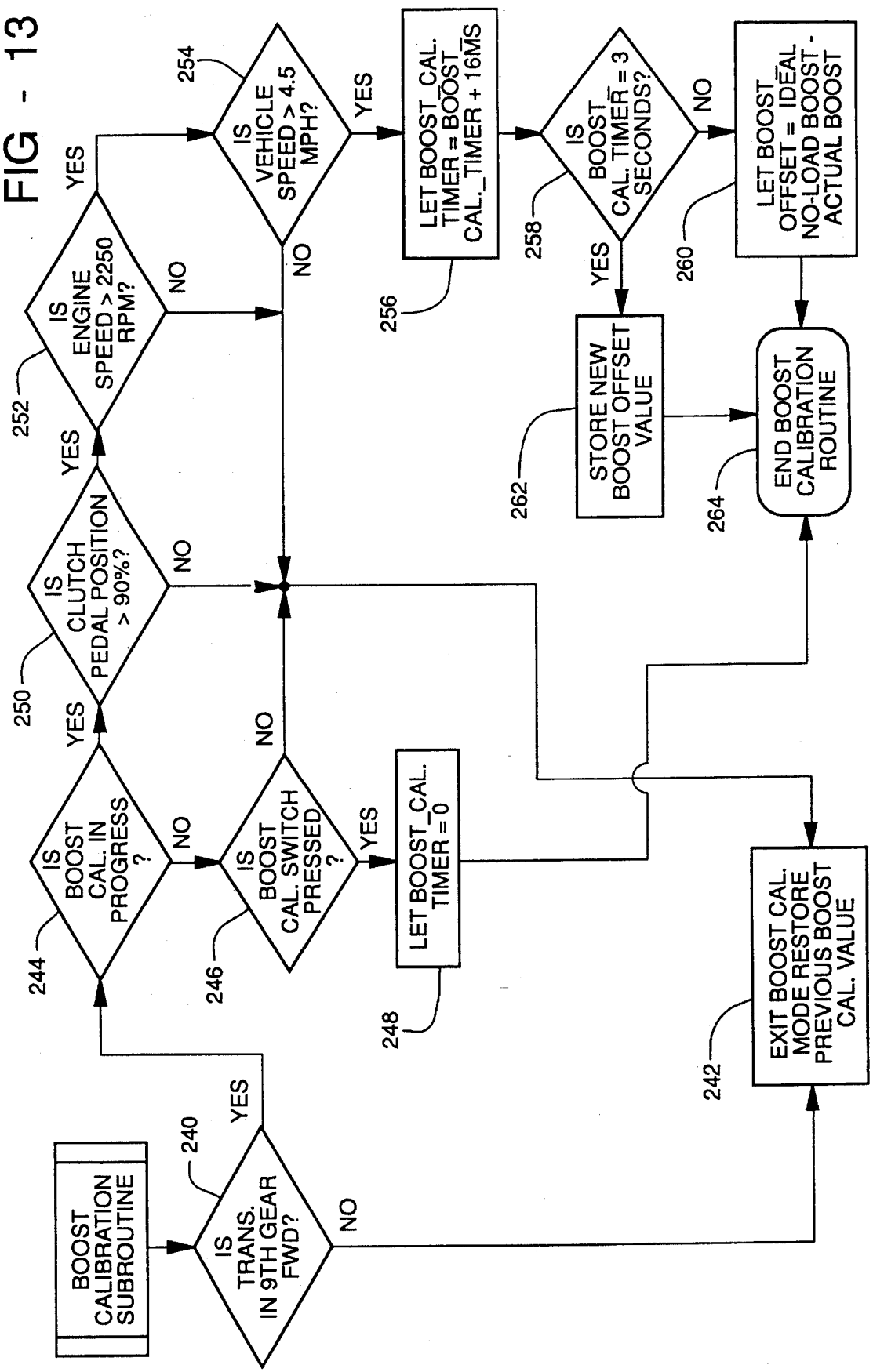
FIG. 13 is a detailed flow chart of the boost calibration subroutine described in simplified form in FIG. 3, which is used to determine a boost offset value for producing a normalized turbo boost value to compensate for vehicle to vehicle variations in turbo boost sensor readings.

Referring now to FIG. 13, the boost calibration subroutine called for at step 177 of FIG. 9, and illustrated in simplified form in FIG. 3, is described in greater detail. Initially, a check is made, as indicated at step 240, to determine if the transmission is in gear 9F. If not, the boost calibration mode is exited and the previous boost calibration value is used for subsequent determinations of the appropriate PWM duty cycle based on the previously sensed turbo boost signal, as indicated at step 242. If the test at step 240 proves true, a check is made to determine if the boost calibration is already in progress, as indicated at step 244. If this test proves false, a check is made to determine if a boost calibration switch on the display panel within the vehicle has been pressed by the operator, as indicated at step 246. If this test proves true, then a boost calibration timer is set equal to zero, as indicated at step 248, and the routine ends at step 264.

If the test at step 246 proves false (i.e., the boost calibration switch has not been pressed), then the boost calibration mode is exited at step 242. If the test at step 244 proves true, then a check is made to determine if the clutch pedal position is greater than 90% engaged, as indicated at step 250. If this test proves false then the microprocessor 12 determines that the clutch pedal is presently engaged by the operator and the boost calibration mode is exited. If the test at step 250 proves true, however, then the engine speed is checked to determine if it is greater than approximately 2250 rpm, as indicated at step 252. If this test proves false, then the microprocessor 12 determines that the engine is not operating at wide-open-throttle and again exits the boost calibration mode. If this test proves true, however, then a check is made at step 254 to determine if the vehicle speed is greater than about 4.5 mph. This test ensures that the vehicle is traveling at at least a minimum predetermined speed that should be attainable under a no-load condition when in gear 9F. If this test proves false then the microprocessor 12 determines that the calibration cannot be accurately performed and exits the boost calibration mode. If the test proves true, then the boost calibration timer is incremented by a factor of 16 ms, as indicated at step 256, and a check is then made at step 258 to determine if three seconds has elapsed since the boost calibration mode has been entered. If not, a boost offset value is determined by subtracting the actual boost value determined from the baseline turbo boost value under a no-load condition, as indicated at step 260. If the test at step 258 proves true, then the last offset value determined at step 260 is stored at step 262 in the RAM 16 of the microprocessor 12. The boost calibration routine is then terminated, as indicated at step 264.

Referring now to FIGS. 16–19, the preferred methods of the present invention are also applied during upshifts and downshifts between forward gears 10F–18F. Initially, a calibration procedure is undertaken which is identical in form to that shown in FIG. 2 to determine a suitable percentage of reduction in the pressure of directional clutch F2 when upshifts or downshifts are made from one gear to another between gears 10F and 18F while the vehicle is under no-load, and a suitable percentage reduction in the pressure of clutch F2 when the vehicle is under full load during upshifts or downshifts between gears 10F–18F. Accordingly, a percentage in the reduction of the pressure applied by the F2 clutch is determined for both a no-load condition and a full-load condition, along with a suitable time value during which the pressure of the F2 clutch is brought back up so as to fully engage the F2 clutch. The presently preferred value in the reduction of pressure of the F2 clutch during upshifts and downshifts under no-load, between gears 10F–18F, is about 80 percent. Put differently, the pressure to the F2 clutch is reduced preferably by about 80 percent when making any upshift or downshift between gears 10F–18F.

With specific reference to FIG. 16, a waveform 266 illustrates the pressure of the F2 directional clutch during an upshift between gears 10F–11F. As noted by portion 266*a* of waveform 266, the pressure to the F2 clutch drops off very rapidly (almost instantaneously) by about 80 percent to almost completely disengage the F2 clutch during the upshift. This amount of pressure reduction is, in any event, sufficient to "break" the transmission of torque to the output shaft of the transmission. As noted by portion 266*b*, the pressure is then ramped up in accordance with the determined boost percent value (the procedure of which is described in connection with FIG. 12). The boost percent value determines the duty cycle for the PWM drive signal applied to the F2 clutch as well as the time interval in which to bring the F2 clutch back into full engagement. As illustrated by portion 266*c* of waveform 266, after the time represented by the time interval 266*d*, full pressure is thereafter applied by the F2 clutch. Thus, the methods described herein are not only used to control modulation of the F1 and F2 clutches during shifts between gears 9F and 10F, but also during upshifts between gears 10F and 18F.

Referring now to FIG. 17, an upshift between gears 17F and 18F is shown. In FIG. 17 the pressure of the F2 clutch is denoted by waveform 268. Again, the pressure of the F2 clutch is reduced by about 80 percent, as indicated by portion 268*a* of waveform 268, to almost completely disengage the F2 clutch during the upshift. Thereafter, the pressure of the F2 clutch is ramped up, as indicated by portion 268*b* of the waveform 268, until full pressure is again being applied by the F2 clutch, as indicated at portion 268*c* of the waveform 268. It will be noted that the time duration, as denoted by time interval 268*d*, is longer than that for the upshift between gears 10F and 11F. This is because the sensed turbo boost pressure is higher (all other factors being the same) when the vehicle is traveling at a speed suitable to upshift from gear 17F to gear 18F than it is at which a shift from gear 10F to gear 11F takes place. Furthermore, a speed differential between a vehicle ground speed attained in gears 17F and 18F is greater than that attained in gears 10F and 11F. Thus, it is desirable to have a longer time interval between the time when the pressure of the F2 clutch is reduced by about 80 percent to the time when full pressure is again being applied. In the preferred embodiment, under no-load conditions, a time duration of about five seconds during which the pressure is ramped up to full pressure has been determined to provide very satisfactory results. By satisfactory it is meant that the shift is accomplished by modulating the F2 clutch back into full engagement at a rate, and over a time interval, which provides a relatively smooth shift, and which avoids an undesirable jolt or lurch of the vehicle. Accordingly, the pressure to the F2 clutch is ramped up much more gradually during an upshift between gears 17F and 18F than it is between gears 10F and 11F.

Figure 18:
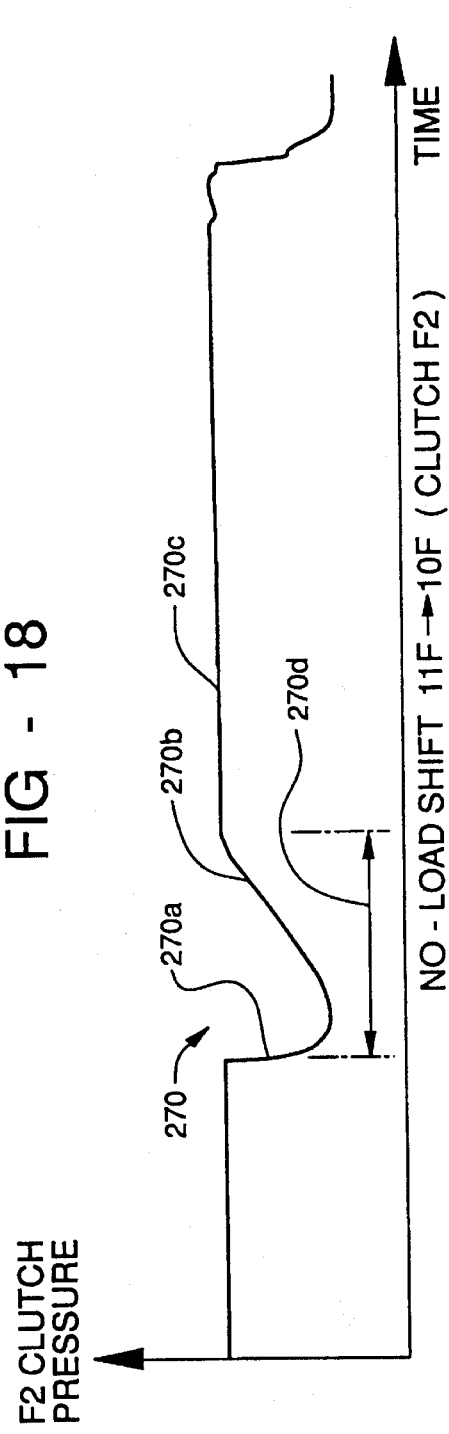
FIG. 18 is a graph of the pressure over time applied by the F2 clutch during downshifting from gear with 11F to gear 10F under a no-load condition.

Referring now to FIG. 18, the pressure applied to the F2 clutch during a downshift from gear 11F to gear 10F is shown by waveform 270. It will be appreciated that the clutch pressure illustrated by waveform 270 is being applied under a no-load condition. Portion 270a denotes a reduction of about 80 percent in the pressure applied by the F2 clutch to almost immediately cause the F2 clutch to become almost completely disengaged. Portion 270b illustrates the pressure being ramped up in accordance with the PWM duty cycle and time interval determined by the calculated boost percent value until full pressure is again being applied by the F2 clutch, as indicated by portion 270c of the waveform 270. The time interval represented by period 270d reflects the total time taken to bring the pressure of the F2 clutch back up to full pressure.

Figure 19:
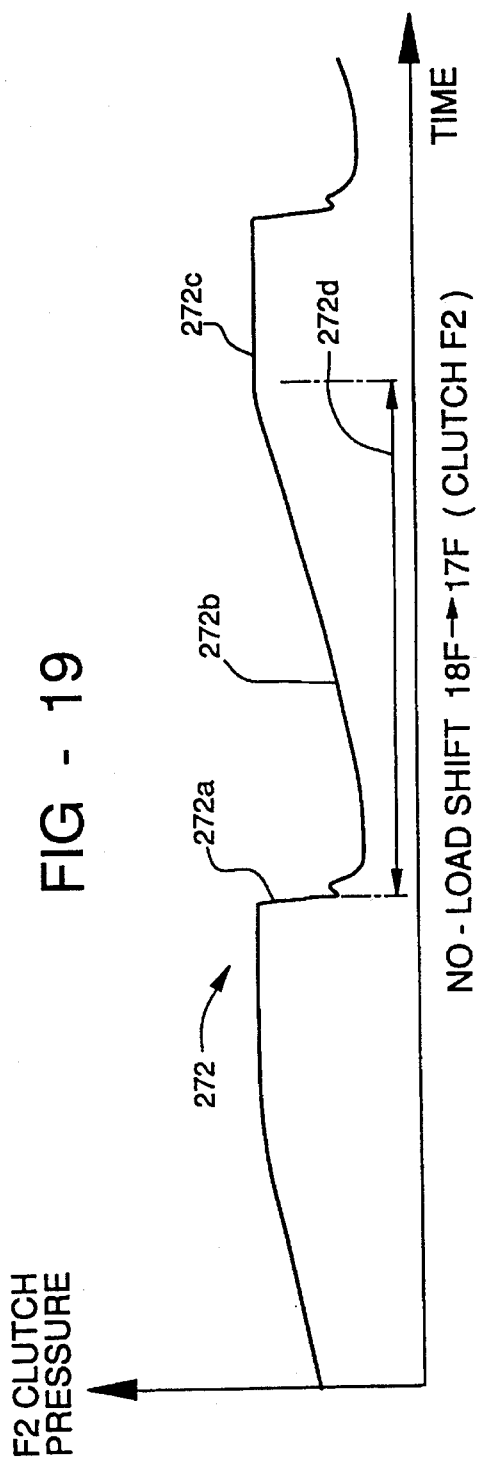
FIG. 19 is a graph of the pressure over time applied to the F2 clutch during a downshift from gear 18F to gear 17F under a no-load condition.

Referring now to FIG. 19, the pressure to the F2 clutch is illustrated during a downshift from gear 18F to gear 17F, as graphically indicated by waveform 272, under a no-load condition. Portion 272a indicates a drop of about 80 percent in the pressure of the F2 clutch as the downshift begins. Thereafter, the pressure of the F2 clutch is ramped up, as indicated by portion 272b of the waveform 272, to bring the pressure of the F2 clutch back to full pressure, as indicated by portion 272c. The time interval indicated by portion 272d is greater than that for a downshift from gear 11F to gear 10F. Again, this is because the boost pressure produced at vehicle operating speeds during a shift between gears 18F and 17F is greater under a no-load condition than the boost pressure generated during a shift between gears 11F and 10F while under a no-load condition.

Accordingly, from the graphs of FIGS. 16–19 it can be seen that the F2 directional clutch is modulated into engagement in accordance with a suitable duty cycle and over a suitable time interval to produce a smooth shift under a no-load condition. If the upshifts of FIGS. 16 and 17 were made by operating under a full-load condition, then portions 266a and 268a of each waveform 266 and 268, respectively, would be significantly shorter and would represent a drop off in the pressure applied to the F2 clutch of only a very small degree, and preferably between about 0 percent and 10 percent. Similarly, if these shifts were made under a full-load condition, portions 266b and 268b would be steeper to cause the time interval 266d or 268d to be significantly reduced, to thus bring the F2 clutch back up to full pressure much more quickly. If the boost pressure value is such as to indicate a load condition at a midpoint between no-load and full-load, then the reduction and pressure illustrated by portions 266a and 268a of waveforms 266 and 268, respectively, would indicate only about a 40 percent drop in the pressure of the F2 clutch. Moreover, if under full-load, the time durations represented by portions 270b and 272b of waveforms 270 and 272, respectively, would be steeper to illustrate more rapid increase in the rate of pressure of the F2 clutch. Those of ordinary skill in the art will also appreciate that the teachings presented herein relating to the controlled modulation of the directional clutches F1 and F2 could also just as easily be applied to clutch F1 during upshifts and downshifts between gears 9F and 9F.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for electronically controlling shifting of a powershift transmission of an agricultural vehicle based upon a load being experienced by an engine of said vehicle, said transmission having at least one proportionally modulatable directional clutch and said engine having a turbocharger which develops a turbo boost pressure in relation to a torque generated by said engine, said method comprising the steps of:

monitoring said turbo boost pressure and generating, within an electronic controller, a turbo boost signal in accordance therewith;

monitoring said engine speed and generating, within the electronic controller, an engine speed signal representative thereof;

modifying said turbo boost signal depending on said engine speed signal to produce, within an electronic controller, a compensated turbo boost signal; and using said compensated turbo boost signal to generate a drive signal operable to modulate said directional clutch into engagement at a desired rate of engagement.

2. The method of claim 1, further comprising the steps of:

determining a turbo boost pressure calibration constant; and modifying said turbo boost signal in accordance with said calibration constant to produce a normalized turbo boost value.

3. The method of claim 2, wherein said turbo boost pressure calibration constant is obtained during a calibration procedure, said calibration procedure is performed at least in part within the electronic controller, the method comprising the steps of:

determining a baseline turbo boost value;

driving said vehicle on a level surface;

maintaining a predetermined engine speed while driving said vehicle under a no-load condition;

monitoring said turbo boost signal for a predetermined time period to obtain a plurality of independent turbo boost signals;

obtaining an average turbo boost signal from said plurality of turbo boost signals;

determining a difference between said average turbo boost signal and said baseline turbo boost signal; and adding said difference to said turbo boost signal prior to using said turbo boost signal to generate said drive signal.

4. The method of claim 1, further comprising the steps of:

determining a no-load turbo boost pressure while said vehicle is being operated under a wide-open-throttle condition under no-load;

determining a full-load turbo boost pressure while said vehicle is being operated under wide-open-throttle and under a full-load condition; and comparing said compensated turbo boost signal with said no-load and full-load turbo boost pressures to determine a percentage turbo boost pressure value; and using said percentage turbo boost pressure value to generate said drive signal to modulate said directional clutch of said powershift transmission into engagement at a rate of engagement which is a percentage of said rate at which said clutch would be modulated under a full-load condition.

5. The method of claim 1, further comprising the step of disengaging said directional clutch by a first percentage in accordance with said compensated turbo boost signal during an upshift of said powershift transmission while under a full-load condition.

6. The method of claim 5, further comprising the step of disengaging said directional clutch by a second percentage which is less than said first percentage and in accordance with said compensated turbo boost signal during upshift of said powershift transmission while under a full-load condition.

7. A method for electronically controlling shifting of a powershift transmission of an agricultural vehicle based upon a load being experienced by said vehicle during said shifting, where said vehicle includes an engine having a turbocharger associated therewith and wherein said turbocharger develops a turbo boost pressure in relation to a torque developed by said engine, said method comprising the steps of:

electronically monitoring said turbo boost pressure developed by said turbocharger and generating a turbo boost signal in accordance therewith;

using said turbo boost signal to approximate a load being experienced by said engine; and electronically generating a drive signal from said turbo boost signal to cause a clutch of said powershift transmission to be engaged at a rate of engagement dependent on said load being experienced by said engine.

8. The method of claim 7, further comprising the steps of:

sensing the speed of said engine; and modifying said turbo boost signal based on said sensed engine speed signal.

9. The method of claim 7, further comprising the step of:

modifying said turbo boost signal by multiplying said sensed turbo boost signal by a predetermined calibration constant to compensate for variations in said turbo boost signal caused by a tolerance condition in said turbocharger.

10. The method of claim 8, further comprising the steps of:

providing a plurality of predetermined engine speed compensation values; and using an electronic controller to select one of said plurality of engine speed compensation values depending on said sensed engine speed.

11. The method of claim 7, further comprising the steps of:

determining a full-load turbo boost value;

determining a no-load turbo boost value;

using said monitored turbo boost signal, said full-load turbo boost value and said no-load turbo boost value to rationalize a percentage of said full-load turbo boost value represented by said monitored turbo boost value; and using said percentage to modify said drive signal when said monitored turbo boost signal falls in between said full-load and no-load turbo boost values.

12. The method of claim 7, further comprising:

controlling a percentage of disengagement of said clutch in accordance with said turbo boost signal during upshifting of said transmission.

13. The method of claim 7, further comprising controlling a percentage of disengagement of said clutch in accordance with said turbo boost signal during downshifting of said transmission.

14. A method for controlling shifting of a powershift transmission of an agricultural vehicle based upon a load being experienced by an engine of said vehicle, said powershift transmission having at least one proportionally modulatable directional clutch and said engine having a turbo charger wherein said turbo charger develops a turbo boost pressure in relation to an engine torque generated by said engine, and wherein said engine torque is related to said load being experienced by said engine, said method comprising the steps of:

determining a no-load turbo boost pressure indicative of a turbo boost pressure generated by said turbo charger when said engine is operated at wide-open-throttle under no-load;

determining a full-load boost pressure indicative of a boost pressure generated by said turbo charger when said engine is operated at wide-open-throttle under a full-load condition;

storing said full-load and no-load boost pressure values in a memory;

monitoring said turbo boost pressure with a boost pressure sensor and generating a turbo boost pressure signal in accordance therewith;

using said sensed boost pressure signal and said full-load and no-load boost pressure values to determine a percentage of said full-load boost pressure value;

using said percentage of said full-load boost pressure value to generate a drive signal for modulating said proportionally modulatable clutch into engagement at a desired rate of engagement dependent upon said sensed turbo boost pressure signal.

15. The method of claim 14, in which an electronic controller is utilized to carry out the method, and further comprising the steps of:

monitoring the speed of said engine and generating an engine speed signal in accordance therewith;

within the electronic controller modifying said turbo boost signal in accordance with said sensed engine speed signal.

16. The method of claim 14, further including the step of obtaining a turbo boost pressure calibration constant during a calibration procedure, said calibration procedure comprising the step of:

driving said vehicle on a level surface under a no-load condition until said engine reaches a predetermined engine speed;

monitoring said turbo boost signal generated while said engine is at said predetermined engine speed and generating an average turbo boost pressure value in accordance therewith;

determining a difference between said average turbo boost pressure value and a predetermined, baseline turbo boost pressure value; and adding said difference to said sensed turbo boost signal prior to generating a drive signal for engaging said proportionally modulatable clutch.

17. A method for controlling shifting of a powershift transmission of an agricultural vehicle based upon the load being experienced by an engine of said vehicle, said transmission having at least one proportionally modulatable directional clutch and said engine having a turbo charger wherein said turbo charger develops a turbo boost pressure in relation to an engine torque developed by said engine at a given time, said method comprising the steps of:

providing a predetermined no-load turbo boost value indicative of a turbo boost pressure generated when said vehicle is operated under a no-load condition at wide-open-throttle;

providing a predetermined full-load turbo boost value indicative of a turbo boost pressure generated when said engine is operating under a full-load condition at wide-open-throttle;

monitoring said turbo boost pressure and generating a turbo boost signal in accordance therewith;

monitoring the speed of said engine and generating an engine speed signal in accordance therewith;

modifying said turbo boost signal by a predetermined factor in accordance with said engine speed signal to produce a conditioned turbo boost signal;

using said conditioned turbo boost signal, said no-load turbo boost value and said full-load turbo boost value to determine a percentage of said full-load turbo boost value represented by said conditioned turbo boost signal;

generating a pulse-width-modulated drive signal having a duty cycle dependent upon said percentage of said full-load turbo boost value represented by said conditioned turbo boost signal; and applying said pulse-width-modulated signal to said proportionally modulatable directional clutch to cause said clutch to become engaged at a desired rate of engagement in accordance with said percentage of said full-load boost value, and thereby in accordance with said load on said vehicle.

18. The method of claim 17, further comprising the step of:

providing a transmission controller having a memory associated therewith;

storing a plurality of engine speed constants in said memory, each one of said engine speed constants representing a value by which said turbo boost signal is to be modified depending upon said engine speed signal.

19. The method of claim 18, further comprising the step of causing said directional clutch to be disengaged by a predetermined degree during upshifting and downshifting between selected gears of said transmission while under said no-load condition.

20. The method of claim 18, further comprising the step of causing said directional clutch to be disengaged by a predetermined degree during upshifting and downshifting between selected gears of said transmission while under a full-load condition.

* * * * *